(12) United States Patent
Stott et al.

(10) Patent No.: US 7,774,620 B1
(45) Date of Patent: Aug. 10, 2010

(54) EXECUTING APPLICATIONS AT APPROPRIATE TRUST LEVELS

(75) Inventors: Nathaniel W. Stott, Redmond, WA (US); Amol S Kelkar, Redmond, WA (US); Brian G. O'Connor, Seattle, WA (US); Lee B Rosenberg, Seattle, WA (US); Alessandro Catorcini, Redmond, WA (US); Arungundram C. Narendran, Bellevue, WA (US); Prakash Sikchi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 10/857,689

(22) Filed: May 27, 2004

(51) Int. Cl.
  *G06F 17/00* (2006.01)
  *G06F 7/04* (2006.01)
  *G06F 17/30* (2006.01)
  *G06F 11/00* (2006.01)
  *G06F 12/14* (2006.01)
  *G06F 12/16* (2006.01)
  *G06F 11/30* (2006.01)
  *H04L 29/06* (2006.01)
  *G08B 23/00* (2006.01)
  *H04N 7/16* (2006.01)
  *B41K 3/38* (2006.01)

(52) U.S. Cl. .............. 713/193; 726/1; 726/2; 726/22; 726/27; 380/59

(58) Field of Classification Search .......... 713/193, 713/189; 726/2–4, 16, 17, 21, 22, 26, 27; 380/59
See application file for complete search history.

(56) References Cited

U.S. PATENT DOCUMENTS

| 4,201,978 A | 5/1980 | Nally |
| 4,498,147 A | 2/1985 | Agnew et al. |
| 4,514,800 A | 4/1985 | Gruner et al. |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,926,476 A * | 5/1990 | Covey ................ 711/163 |

(Continued)

FOREIGN PATENT DOCUMENTS

EP  0841615  5/1998

(Continued)

OTHER PUBLICATIONS

"Extensible Markup Language," Tim Bray, Jean Paoli, C. M. Sperberg-McQueen, W3C, Feb. 10, 1998.*

(Continued)

*Primary Examiner*—Nasser Moazzami
*Assistant Examiner*—Oscar A Louie

(57) ABSTRACT

Systems and methods that enable execution of applications at appropriate trust levels are described. These systems and methods can determine appropriate trust levels by comparing applications' permitted trust levels with their requested trust levels. These systems and methods can determine applications' permitted trust levels by comparing applications' execution locations with their published locations. Applications can also be executed at a restricted trust level at which potentially dangerous operations are prohibited.

13 Claims, 7 Drawing Sheets

U.S. PATENT DOCUMENTS

| | | |
|---|---|---|
| 4,933,880 A | 6/1990 | Borgendal et al. |
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,140,563 A | 8/1992 | Thinesen |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A * | 7/1997 | Theimer et al. ............ 726/4 |
| 5,659,729 A | 8/1997 | Nielsen |
| 5,664,133 A | 9/1997 | Malamud et al. |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,873,088 A | 2/1999 | Hayashi et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,953,731 A | 9/1999 | Glaser |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A * | 11/1999 | Luckenbaugh ............ 726/1 |

| Patent No. | Date | Inventor |
|---|---|---|
| 5,995,103 A | 11/1999 | Ashe |
| 5,999,740 A | 12/1999 | Rowley |
| 6,005,570 A | 12/1999 | Gayraud et al. |
| 6,006,227 A | 12/1999 | Freeman et al. |
| 6,012,066 A | 1/2000 | Discount et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,057,837 A | 5/2000 | Hatakeda et al. |
| 6,058,413 A | 5/2000 | Flores et al. |
| 6,065,043 A | 5/2000 | Domenikos et al. |
| 6,069,626 A | 5/2000 | Cline et al. |
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,679 A | 7/2000 | Barkley |
| 6,088,708 A | 7/2000 | Burch et al. |
| 6,091,417 A | 7/2000 | Lefkowitz |
| 6,094,657 A | 7/2000 | Hailpern et al. |
| 6,096,096 A | 8/2000 | Murphy et al. |
| 6,097,382 A | 8/2000 | Rosen et al. |
| 6,098,081 A | 8/2000 | Heidorn et al. |
| 6,105,012 A | 8/2000 | Chang et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,423 B1 | 4/2001 | Davis |
| 6,219,698 B1 | 4/2001 | Iannucci et al. |
| 6,225,996 B1 | 5/2001 | Gibb et al. |
| 6,235,027 B1 | 5/2001 | Herzon |
| 6,243,088 B1 | 6/2001 | McCormack et al. |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,709 B1 | 8/2001 | Reha et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,292,941 B1 | 9/2001 | Jollands |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 * | 10/2001 | Goertzel et al. ................. 726/9 |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,214 B1 | 1/2002 | Sundaresan |
| 6,342,907 B1 | 1/2002 | Petty et al. |
| 6,343,149 B1 | 1/2002 | Motoiwa |
| 6,343,302 B1 | 1/2002 | Graham |
| 6,343,377 B1 | 1/2002 | Gessner et al. |
| 6,344,862 B1 | 2/2002 | Williams et al. |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,421,777 B1 | 7/2002 | Pierre-Louis |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,007 B1 | 12/2002 | Pang |
| 6,493,702 B1 | 12/2002 | Adar et al. |

| | | |
|---|---|---|
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 * | 1/2003 | Chan et al. ................ 713/164 |
| 6,507,856 B1 | 1/2003 | Chen et al. |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| RE38,070 E | 4/2003 | Spies et al. |
| 6,546,546 B1 | 4/2003 | Van Doorn et al. |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin et al. |
| 6,748,569 B1 | 6/2004 | Brooke et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,876,996 B2 | 4/2005 | Czajkowski et al. |
| 6,883,168 B1 | 4/2005 | James et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,548 B1 | 2/2006 | Barck et al. |
| 7,003,722 B2 | 2/2006 | Rothchiller et al. |
| 7,010,580 B1 | 3/2006 | Fu et al. |
| 7,020,869 B2 | 3/2006 | Abriari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,076,728 B2 | 7/2006 | Davis et al. |
| 7,080,083 B2 | 7/2006 | Kim et al. |
| 7,080,325 B2 | 7/2006 | Treibach-Heck et al. |

| | | | |
|---|---|---|---|
| 7,081,882 B2 | 7/2006 | Sowden et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,107,539 B2 | 9/2006 | Abbott et al. |
| 7,120,863 B1 | 10/2006 | Wang |
| 7,124,167 B1 | 10/2006 | Bellotti et al. |
| 7,130,885 B2 | 10/2006 | Chandra et al. |
| 7,143,341 B1 | 11/2006 | Kohli |
| 7,146,564 B2 | 12/2006 | Kim et al. |
| 7,152,205 B2 | 12/2006 | Day et al. |
| 7,159,011 B1 | 1/2007 | Knight et al. |
| 7,168,035 B1 | 1/2007 | Bell et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,200,665 B2 | 4/2007 | Eshghi et al. |
| 7,200,816 B2 | 4/2007 | Falk et al. |
| 7,213,200 B2 | 5/2007 | Abe et al. |
| 7,236,982 B2 | 6/2007 | Zlatanov et al. |
| 7,237,114 B1 | 6/2007 | Rosenberg |
| 7,249,328 B1 | 7/2007 | Davis |
| 7,272,789 B2 | 9/2007 | O'Brien |
| 7,281,018 B1 | 10/2007 | Begun et al. |
| 7,281,206 B2 | 10/2007 | Schnelle et al. |
| 7,281,245 B2 | 10/2007 | Reynar et al. |
| 7,284,208 B2 | 10/2007 | Matthews |
| 7,287,218 B1 | 10/2007 | Knotz et al. |
| 7,296,017 B2 | 11/2007 | Larcheveque et al. |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,337,391 B2 | 2/2008 | Clarke et al. |
| 7,337,392 B2 | 2/2008 | Lue |
| 7,346,840 B1 | 3/2008 | Ravishankar et al. |
| 7,346,848 B1 | 3/2008 | Ruthfield et al. |
| 7,370,066 B1 | 5/2008 | Sikchi et al. |
| 7,373,595 B2 | 5/2008 | Jones et al. |
| 7,376,673 B1 | 5/2008 | Chalecki et al. |
| 7,412,649 B2 | 8/2008 | Emek et al. |
| 7,424,671 B2 | 9/2008 | Elza et al. |
| 7,428,699 B1 | 9/2008 | Kane et al. |
| 7,441,200 B2 | 10/2008 | Savage |
| 7,490,109 B1 | 2/2009 | Sikchi et al. |
| 7,496,632 B2 | 2/2009 | Chapman et al. |
| 7,496,837 B1 | 2/2009 | Larcheveque et al. |
| 7,543,228 B2 | 6/2009 | Kelkar |
| 7,549,115 B2 | 6/2009 | Kotler |
| 7,584,417 B2 | 9/2009 | Friend |
| 7,613,996 B2 | 11/2009 | Dallett et al. |
| 7,673,227 B2 | 3/2010 | Kotler |
| 7,673,228 B2 | 3/2010 | Kelkar |
| 7,676,843 B1 | 3/2010 | Stott |
| 7,689,929 B2 | 3/2010 | Ruthfield |
| 7,692,636 B2 | 4/2010 | Kim |
| 7,712,022 B2 | 5/2010 | Smuga |
| 7,721,190 B2 | 5/2010 | Sikchi |
| 7,725,834 B2 | 5/2010 | Bell |
| 2001/0007109 A1 | 7/2001 | Lange |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0044850 A1 | 11/2001 | Raz et al. |
| 2001/0051928 A1* | 12/2001 | Brody ................... 705/52 |
| 2001/0054004 A1 | 12/2001 | Powers |
| 2001/0056411 A1 | 12/2001 | Lindskog et al. |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk, Jr. et al. |
| 2002/0010855 A1 | 1/2002 | Reshef et al. |
| 2002/0013788 A1 | 1/2002 | Pennell et al. |
| 2002/0019941 A1 | 2/2002 | Chan et al. |
| 2002/0023113 A1 | 2/2002 | Hsing et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0052769 A1 | 5/2002 | Navani et al. |
| 2002/0053021 A1 | 5/2002 | Rice et al. |
| 2002/0054126 A1 | 5/2002 | Gamon |
| 2002/0057297 A1 | 5/2002 | Grimes et al. |
| 2002/0065798 A1 | 5/2002 | Bostleman et al. |
| 2002/0065847 A1 | 5/2002 | Furukawa et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0083145 A1 | 6/2002 | Perinpanathan |
| 2002/0083148 A1 | 6/2002 | Shaw et al. |
| 2002/0083318 A1 | 6/2002 | Larose |
| 2002/0091738 A1 | 7/2002 | Rohrabaugh et al. |
| 2002/0099952 A1 | 7/2002 | Lambert et al. |
| 2002/0100027 A1 | 7/2002 | Binding et al. |
| 2002/0107885 A1 | 8/2002 | Brooks et al. |
| 2002/0111699 A1 | 8/2002 | Melli et al. |
| 2002/0111932 A1 | 8/2002 | Roberge et al. |
| 2002/0112224 A1 | 8/2002 | Cox |
| 2002/0129056 A1 | 9/2002 | Conant |
| 2002/0133484 A1 | 9/2002 | Chau et al. |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0178187 A1 | 11/2002 | Rasmussen et al. |
| 2002/0178380 A1 | 11/2002 | Wolf et al. |
| 2002/0184188 A1 | 12/2002 | Mandyam et al. |
| 2002/0184219 A1 | 12/2002 | Preisig et al. |
| 2002/0184401 A1 | 12/2002 | Kadel, Jr. et al. |
| 2002/0184485 A1 | 12/2002 | Dray et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0025693 A1 | 2/2003 | Haley |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0037303 A1 | 2/2003 | Bodlaender et al. |
| 2003/0038788 A1 | 2/2003 | Demartines et al. |
| 2003/0038846 A1 | 2/2003 | Hori et al. |
| 2003/0043986 A1 | 3/2003 | Creamer et al. |

| | | | | | | |
|---|---|---|---|---|---|---|
| 2003/0046665 A1 | 3/2003 | Ilin | 2004/0073565 A1 | 4/2004 | Kaufman et al. |
| 2003/0048301 A1 | 3/2003 | Menninger | 2004/0073868 A1 | 4/2004 | Easter et al. |
| 2003/0051243 A1 | 3/2003 | Lemmons et al. | 2004/0078756 A1 | 4/2004 | Napper et al. |
| 2003/0055811 A1 | 3/2003 | Stork et al. | 2004/0083426 A1 | 4/2004 | Sahu |
| 2003/0055828 A1 | 3/2003 | Koch et al. | 2004/0088647 A1 | 5/2004 | Miller et al. |
| 2003/0056198 A1 | 3/2003 | Al-Azzawe et al. | 2004/0088652 A1 | 5/2004 | Abe et al. |
| 2003/0061386 A1 | 3/2003 | Brown | 2004/0093596 A1 | 5/2004 | Koyano |
| 2003/0061567 A1 | 3/2003 | Brown et al. | 2004/0107367 A1 | 6/2004 | Kisters |
| 2003/0069881 A1 | 4/2003 | Huttunen | 2004/0117769 A1 | 6/2004 | Lauzon et al. |
| 2003/0093755 A1 | 5/2003 | O'Carroll | 2004/0123277 A1 | 6/2004 | Schrader et al. |
| 2003/0110443 A1 | 6/2003 | Yankovich et al. | 2004/0139400 A1 | 7/2004 | Allam et al. |
| 2003/0120578 A1 | 6/2003 | Newman | 2004/0146199 A1 | 7/2004 | Berkner et al. |
| 2003/0120651 A1 | 6/2003 | Bernstein et al. | 2004/0148178 A1 | 7/2004 | Brain |
| 2003/0120659 A1 | 6/2003 | Sridhar | 2004/0148514 A1* | 7/2004 | Fee et al. .................... 713/200 |
| 2003/0120671 A1 | 6/2003 | Kim et al. | 2004/0148571 A1 | 7/2004 | Lue |
| 2003/0120686 A1 | 6/2003 | Kim et al. | 2004/0162741 A1 | 8/2004 | Flaxer et al. |
| 2003/0126555 A1 | 7/2003 | Aggarwal et al. | 2004/0163041 A1 | 8/2004 | Engel |
| 2003/0128196 A1 | 7/2003 | Lapstun et al. | 2004/0163046 A1 | 8/2004 | Chu et al. |
| 2003/0135825 A1 | 7/2003 | Gertner et al. | 2004/0172442 A1 | 9/2004 | Ripley |
| 2003/0140132 A1 | 7/2003 | Champagne et al. | 2004/0181543 A1 | 9/2004 | Wu et al. |
| 2003/0140160 A1 | 7/2003 | Raz et al. | 2004/0181711 A1 | 9/2004 | Johnson et al. |
| 2003/0142072 A1 | 7/2003 | Lapstun et al. | 2004/0186762 A1 | 9/2004 | Beaven et al. |
| 2003/0149934 A1 | 8/2003 | Worden | 2004/0189708 A1 | 9/2004 | Larcheveque et al. |
| 2003/0158897 A1 | 8/2003 | Ben-Natan et al. | 2004/0189716 A1 | 9/2004 | Paoli et al. |
| 2003/0163285 A1 | 8/2003 | Nakamura et al. | 2004/0194035 A1 | 9/2004 | Chakraborty |
| 2003/0167277 A1 | 9/2003 | Hejlsberg et al. | 2004/0199572 A1 | 10/2004 | Hunt et al. |
| 2003/0172113 A1 | 9/2003 | Cameron et al. | 2004/0205473 A1 | 10/2004 | Fisher et al. |
| 2003/0182268 A1 | 9/2003 | Lal | 2004/0205525 A1 | 10/2004 | Murren et al. |
| 2003/0182327 A1 | 9/2003 | Ramanujam et al. | 2004/0205534 A1 | 10/2004 | Koelle |
| 2003/0187756 A1 | 10/2003 | Klivington et al. | 2004/0205571 A1 | 10/2004 | Adler et al. |
| 2003/0187930 A1 | 10/2003 | Ghaffar et al. | 2004/0205592 A1 | 10/2004 | Huang |
| 2003/0188260 A1 | 10/2003 | Jensen et al. | 2004/0205605 A1 | 10/2004 | Adler et al. |
| 2003/0189593 A1 | 10/2003 | Yarvin | 2004/0205644 A1 | 10/2004 | Shaughnessy et al. |
| 2003/0192008 A1 | 10/2003 | Lee | 2004/0205653 A1 | 10/2004 | Hadfield et al. |
| 2003/0200506 A1 | 10/2003 | Abe et al. | 2004/0205671 A1 | 10/2004 | Sukehiro et al. |
| 2003/0204481 A1 | 10/2003 | Lau | 2004/0210599 A1 | 10/2004 | Friedman et al. |
| 2003/0204511 A1 | 10/2003 | Brundage | 2004/0210645 A1 | 10/2004 | Kouznetsov et al. |
| 2003/0204814 A1 | 10/2003 | Elo et al. | 2004/0216084 A1 | 10/2004 | Brown et al. |
| 2003/0205615 A1 | 11/2003 | Marappan | 2004/0221238 A1 | 11/2004 | Cifra et al. |
| 2003/0210428 A1 | 11/2003 | Bevlin et al. | 2004/0221245 A1 | 11/2004 | Chickles et al. |
| 2003/0212664 A1 | 11/2003 | Breining et al. | 2004/0237030 A1 | 11/2004 | Malkin |
| 2003/0212902 A1 | 11/2003 | van der Made | 2004/0260593 A1 | 12/2004 | Abraham-Fuchs et al. |
| 2003/0217053 A1 | 11/2003 | Bachman et al. | 2004/0261019 A1 | 12/2004 | Imamura et al. |
| 2003/0218620 A1 | 11/2003 | Lai et al. | 2004/0268229 A1 | 12/2004 | Paoli et al. |
| 2003/0220930 A1 | 11/2003 | Milleker et al. | 2005/0004893 A1 | 1/2005 | Sangroniz |
| 2003/0225469 A1 | 12/2003 | DeRemer et al. | 2005/0005248 A1 | 1/2005 | Rockey et al. |
| 2003/0225768 A1 | 12/2003 | Chaudhuri | 2005/0015279 A1 | 1/2005 | Rucker |
| 2003/0225829 A1 | 12/2003 | Pena et al. | 2005/0015732 A1 | 1/2005 | Vedula et al. |
| 2003/0226132 A1 | 12/2003 | Tondreau et al. | 2005/0022115 A1 | 1/2005 | Baumgartner et al. |
| 2003/0233374 A1 | 12/2003 | Spinola et al. | 2005/0027757 A1 | 2/2005 | Kiessig et al. |
| 2003/0233644 A1 | 12/2003 | Cohen et al. | 2005/0028073 A1 | 2/2005 | Henry et al. |
| 2003/0236859 A1 | 12/2003 | Vaschillo et al. | 2005/0033626 A1 | 2/2005 | Kruse et al. |
| 2003/0236903 A1 | 12/2003 | Piotrowski | 2005/0033728 A1 | 2/2005 | James |
| 2003/0237046 A1 | 12/2003 | Parker et al. | 2005/0038711 A1 | 2/2005 | Marlelo |
| 2003/0237047 A1 | 12/2003 | Borson | 2005/0050066 A1 | 3/2005 | Hughes |
| 2004/0002939 A1 | 1/2004 | Arora | 2005/0055627 A1 | 3/2005 | Lloyd et al. |
| 2004/0002950 A1 | 1/2004 | Brennan et al. | 2005/0060324 A1 | 3/2005 | Johnson et al. |
| 2004/0003031 A1 | 1/2004 | Brown et al. | 2005/0060647 A1 | 3/2005 | Doan et al. |
| 2004/0003353 A1 | 1/2004 | Rivera et al. | 2005/0060721 A1 | 3/2005 | Choudhary et al. |
| 2004/0003389 A1 | 1/2004 | Reynar et al. | 2005/0065933 A1 | 3/2005 | Goering |
| 2004/0006744 A1 | 1/2004 | Jones et al. | 2005/0065936 A1 | 3/2005 | Goering |
| 2004/0010752 A1 | 1/2004 | Chan et al. | 2005/0066287 A1 | 3/2005 | Tattrie et al. |
| 2004/0015783 A1 | 1/2004 | Lennon et al. | 2005/0071752 A1 | 3/2005 | Marlatt |
| 2004/0024842 A1 | 2/2004 | Witt | 2005/0076049 A1 | 4/2005 | Qubti et al. |
| 2004/0030991 A1 | 2/2004 | Hepworth et al. | 2005/0080801 A1 | 4/2005 | Kothandaraman et al. |
| 2004/0039881 A1 | 2/2004 | Shoebridge et al. | 2005/0091305 A1 | 4/2005 | Lange et al. |
| 2004/0039990 A1 | 2/2004 | Bakar et al. | 2005/0097536 A1 | 5/2005 | Bernstein et al. |
| 2004/0039993 A1 | 2/2004 | Kougiouris et al. | 2005/0102370 A1 | 5/2005 | Lin et al. |
| 2004/0044961 A1 | 3/2004 | Pesenson | 2005/0102612 A1 | 5/2005 | Allan et al. |
| 2004/0044965 A1 | 3/2004 | Toyama et al. | 2005/0108104 A1 | 5/2005 | Woo |
| 2004/0046789 A1 | 3/2004 | Inanoria | 2005/0108624 A1 | 5/2005 | Carrier |
| 2004/0054966 A1 | 3/2004 | Busch et al. | 2005/0114757 A1 | 5/2005 | Sahota et al. |
| 2004/0059754 A1 | 3/2004 | Barghout et al. | 2005/0114764 A1 | 5/2005 | Gudenkauf et al. |

| | | |
|---|---|---|
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0149726 A1* | 7/2005 | Joshi et al. .................. 713/164 |
| 2005/0159136 A1 | 7/2005 | Rouse et al. |
| 2005/0160398 A1 | 7/2005 | Bjornson et al. |
| 2005/0171746 A1 | 8/2005 | Thalhammer-Reyero |
| 2005/0198086 A1 | 9/2005 | Moore et al. |
| 2005/0198125 A1 | 9/2005 | Beck et al. |
| 2005/0198247 A1 | 9/2005 | Perry et al. |
| 2005/0210263 A1 | 9/2005 | Levas et al. |
| 2005/0223063 A1 | 10/2005 | Chang et al. |
| 2005/0223320 A1 | 10/2005 | Brintzenhofe et al. |
| 2005/0234890 A1 | 10/2005 | Enzler et al. |
| 2005/0246304 A1 | 11/2005 | Knight et al. |
| 2005/0257148 A1 | 11/2005 | Goodman et al. |
| 2005/0262112 A1 | 11/2005 | Moore |
| 2005/0268217 A1 | 12/2005 | Garrison |
| 2005/0268222 A1 | 12/2005 | Cheng |
| 2006/0010386 A1 | 1/2006 | Khan |
| 2006/0020586 A1 | 1/2006 | Prompt et al. |
| 2006/0026500 A1 | 2/2006 | Qa 'Im-maqami' |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0075245 A1 | 4/2006 | Meier |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0107206 A1 | 5/2006 | Koskimies |
| 2006/0129583 A1 | 6/2006 | Catorcini et al. |
| 2006/0129978 A1 | 6/2006 | Abriani et al. |
| 2006/0136422 A1 | 6/2006 | Matveief et al. |
| 2006/0143220 A1 | 6/2006 | Spencer, Jr. |
| 2006/0155857 A1 | 7/2006 | Feenan et al. |
| 2006/0161559 A1 | 7/2006 | Bordawekar et al. |
| 2006/0161837 A1 | 7/2006 | Kelkar et al. |
| 2006/0173865 A1 | 8/2006 | Fong |
| 2006/0184393 A1 | 8/2006 | Ewin et al. |
| 2006/0195413 A1 | 8/2006 | Davis et al. |
| 2006/0200754 A1 | 9/2006 | Kablesh et al. |
| 2006/0230363 A1 | 10/2006 | Rapp |
| 2006/0248468 A1 | 11/2006 | Constantine et al. |
| 2007/0005611 A1 | 1/2007 | Takasugi et al. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0088554 A1 | 4/2007 | Harb et al. |
| 2007/0094589 A1 | 4/2007 | Paoli |
| 2007/0100877 A1 | 5/2007 | Paoli |
| 2007/0101280 A1 | 5/2007 | Paoli |
| 2007/0118538 A1 | 5/2007 | Ahern et al. |
| 2007/0118803 A1 | 5/2007 | Walker et al. |
| 2007/0130500 A1 | 6/2007 | Rivers-Moore et al. |
| 2007/0130504 A1 | 6/2007 | Betancourt et al. |
| 2007/0186157 A1 | 8/2007 | Walker et al. |
| 2007/0208606 A1 | 9/2007 | Mackay et al. |
| 2007/0208769 A1 | 9/2007 | Boehm et al. |
| 2007/0276768 A1 | 11/2007 | Pallante |
| 2008/0021916 A1 | 1/2008 | Schnelle et al. |
| 2008/0028340 A1 | 1/2008 | Davis |
| 2008/0052287 A1 | 2/2008 | Stanciu |
| 2008/0126402 A1 | 5/2008 | Sitchi et al. |
| 2008/0134162 A1 | 6/2008 | James |
| 2009/0070411 A1 | 3/2009 | Chang et al. |
| 2009/0119580 A1 | 5/2009 | Rohrabaugh et al. |
| 2009/0138389 A1 | 5/2009 | Barthel |
| 2009/0177961 A1 | 7/2009 | Fortini |
| 2010/0125788 A1 | 5/2010 | Kelkar |

FOREIGN PATENT DOCUMENTS

| | | |
|---|---|---|
| EP | 0841615 | 11/1999 |
| EP | 0961197 | 12/1999 |
| EP | 1076290 | 2/2001 |
| JP | 63085960 | 4/1988 |
| JP | 401173140 | 7/1989 |
| JP | 401173140 A | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 10171662 | 6/1998 |
| JP | 10207805 | 8/1998 |
| JP | 2000132436 | 5/2000 |
| JP | 2002183652 | 6/2002 |
| JP | 2003173288 | 6/2003 |
| WO | WO 99/24945 | 5/1999 |
| WO | WO-9924945 | 5/1999 |
| WO | WO 99/56207 | 11/1999 |
| WO | WO-9956207 | 11/1999 |
| WO | WO 01/44934 | 6/2001 |
| WO | WO-0144934 | 6/2001 |
| WO | WO0157720 | 8/2001 |

OTHER PUBLICATIONS

"Extensible Markup Language," W3C, Tim Bray, Jean Paoli, C. M. Sperberg-McQueen, Feb. 10, 1998.*
U.S. Appl. No. 60/209,713, Kutay et al.
U.S. Appl. No. 60/191,662, Moore et al.
U.S. Appl. No. 60/203,081, Ben-Natan et al.
"Architecture for a Dynamic Information Area Control" IBM Technical Disclosure Bulletin IBM Corp. New York US vol. 37 No. 10 Jan. 10, 1994. pp. 245-246.
Alschuler Liora "A tour of Xmetal" O'Reilly XML.COM 'Online Jul. 14, 1999 XP002230081 retrieved from the Internet: <URL:http://www.xml.com/pub/a/SeyboldReport/ip0311025.html> retrieved on Feb. 5, 2003.
Au Irene et al. "Netscape Communicator's Collapsible Toolbars" CHI'98 Human Factors in Computing Systems Conference Proceedings Los Angeles CA Apr. 18-23, 1998 pp. 81-86.
Battle Steven A. et al.; "Flexible Information Presentation with XML" 1998 The Institution of Electrical Engineers 6 pages.
Brogden William; "Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.
Chen Yi et al.: A; "XKvalidator: A Constraint Validator for XML" CIKM '-2 Nov. 4-9, 2002 Copyright 2002 ACM 1-58113-492-4/02/0011 pp. 446-452.
Ciancarini Paolo et al.; "Managing Complex Documents Over the WWW: A Case Study for XML" IEEE Transactions on Knowledge and Data Engineering Vo.l. 11 No. 4 Jul./Aug. 1999. pp. 629-938.
Davidow Ari: Alle; "XML Editors: Allegations of Functionality in search of reality" Internet 'Online! 1999 XP002230082 retrieved from the Internet <URL:http://www.ivritype.com/xml/>.
Kanemoto Hirotaka et al; "An Efficiently Updatable Index Scheme for Structured Documents" 1998 IEEE pp. 991-996.
Sutanthavibul Supoj et al.; "XFIG Version 3.2 Patchlevel 2 (Jul. 2, 1998) Users Manual (Edition 1.0)" Internet Document [Online] Jul.

2, 1998 XP002229137 Retrieved from the Internet <URL:http://www.ice.mtu.edu/online_docs/xfig332/> [retrieved on Jan. 28, 2003].

Usdin Tommie et al.; Not a; "XML: Not a Silver Bullet But a Great Pipe Wrench" Standardview vol. 6. No. 3 Sep. 1998 pp. 125-132.

Chien Shu-Yao et al.; "Efficient Management of Multiversion Documents by Object Referencing" Proceedings of the 27th VLDB Conference 2001 pp. 291-300.

Chien Shu-Yao et al.; "Efficient schemes for managing mulitversion XML documents" VLDB Journal (2002) pp. 332-352.

Chien Shu-Yao et al.; "Storing and Querying Multiversion XML Documents using Durable Node Numbers" IEEE 2002 pp. 232-241.

Chien Shu-Yao et al.; "XML Document Versioning" SIGMOD Record vol. 30 No. 3 Spet 2001 pp. 46-53.

Dyck Timothy; "XML Spy Tops as XML Editor" http://www.eweek.com/article2/0395972404100.asp Nov. 25, 2002 4 pages.

Haukeland Jan-Henrick; "Tsbiff—tildeslash biff—version 1.2.1" Internet Document [Online] Jun. 1999 URL: http://web.archive.org/web/19990912001527/http://www.tildeslash.com/tsbiff/.

Nelson Mark; "Validation with MSXML and XML Schema" Windows Developer Magazine Jan. 2002 pp. 35-38.

Netscape Communication Corpora; "Netscape Communicator 4.61 for OS/2 Warp" Software 1999 The whole software release & "Netscape—Version 4.6 [en]-010615" Netscape Screenhot Oct. 2, 2002.

Noore A.; "A secure conditional access system using digital signature and encryption" 2003 Digest of Technical Papers. International Conference on Consumer Electronics Jun. 2003 pp. 220-221.

Rogge et al.; "Validating MPEG-21 Encapsulated Functional Metadata" IEEE 2002 pp. 209-212.

Wong Raymond K. et al.; "Managing and Querying Multi-Version XML Data with Update Logging" DocEng '02 Nov. 8-9, 2002 Copyright 2002 ACM 1-58113-594-7/02/0011 pp. 74-81.

Cheng Ya Bing et al.; "Designing Valid XML Views" ER 2002 LNCS 2503 2002 Springer-Verlag Berlin Heidelberg 2002 pp. 463-477.

Chuang Tyng-Ruey; "Generic Validation of Structural Content with Parametric Modules" ICFP '01 Sep. 3-5, 2001 Copyright 2001 ACM 1-58113-415-0/01/0009 pp. 98-109.

Dayton Linnea and Jack Davis; "Photo Shop 5/5.5 Wow! Book" 2000 Peachpit Press pp. 8-17.

Hall Richard Scott; "Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.

Hardy Mathew R. B. et al; "Mapping and Displaying Structural Transformations between XML and PDF" DocEng '02 Nov. 8-9, 2002 Copyright 2002 ACM 1-58113-597-7/02/0011 pp. 95-102.

Kim Sang-Kyun et al.; "Immediate and Partial Validation Mechanism for the Conflict Resolution of Update Operations in XML Databases" WAIM 2002 LNCS 2419 2002 pp. 387-396 Springer-Verlag Berlin Heidelberg 2002.

Netscape Communication Corp; "SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

Tomimori et al.; "An Efficient and Flexible Access Control Framework for Java Programs in Mobile Terminals"; 22nd International Conference on Distributed Computing Systems Workshops; 2002; pp. 777-782.

Van Hoff Arthur et al.; "The Open Software Description Format" Online Aug. 13, 1997 retrieved from the Internet on Nov. 7, 2003: <http://www.w3.org/TR/NOTE-OSD> 11 pages.

Verlamis Iraklis et al.; "Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

Williams Sara and Charlie Kin; "The Component Object Model" A Technical Overview Oct. 1994 Microsoft Corp. pp. 1-14.

Pacheco et al, "Delphi 5 Developer's Guide," Sams Publishing, 1999, Chapter 31 Section: Data Streaming, 6 pages.

"Netscape window," Netscape Screenshot Oct. 2, 2002.

Clarke P., "From small beginnings" Knowledge Management Nov. 2001, pp. 28-30.

Hwang et al., "Micro-Firewalls for Dynamic Network Security with Distributed Intrusion Detection"; IEEE International Symposium on Network Computing and Applications; 2001; pp. 68-79.

Kaiya et al., "Specifying Runtime Environments and Functionalities of Downloadable Components Under the Sandbox Mode"; International Symposium on Principles of Software Evolution; 2000; pp. 138-142.

Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.

Sun Q. et al., "A robust and secure media signature scheme for JPEG images" Proceedings of 2002 IEEE Workshop on Multimedia Signal Processing, Dec. 2002, pp. 296-299.

Prevelakis et al., "Sandboxing Applications"; Proceedings of the FREENIX Track; 2001; pp. 119-126.

Schmid et al., "Protection Data from Malicious Software"; 18th Annual Computer Security Applications Conference; 2002; pp. 199-208.

Trupin J., "The Visual Programmer," Microsoft Systems Journal, Apr. 1996, pp. 103-105.

Zdonik S., "Object Management System Concepts," ACM, 1984, pp. 13-19.

"Store and Organize Related Project Files in a Binder," Getting Results with Microsoft Office, 1990, pp. 109-112.

Barker et al., "Creating In-Line Objects Within An Integrated Editing Environment," IBM Technical Disclosure Bulletin, vol. 27, No. 5, Oct. 1984, p. 2962.

Berg A., "Naming and Binding: Monikers" Inside OLE, 1995, Chapter 9, pp. 431-490.

Clapp D., "The NeXT Application Kit Part I: Non-Responsive Classes," The NeXT Bible 1990, Chapter 16, pp. 275-293.

DiLascia et al, "Sweeper" Microsoft Interactive Developer, vol. 1, No. 1, 1996, 27 pages.

Herzner et al., "CDAM- Compound Document Access and Management. An Object-Oriented Approach" Multimedia Systems Interaction and Applications, 1992, Chapter 3, pp. 17-36.

Kobayashi et al., "An Update on BTRON-specification OS Development" IEEE 1991 pp. 132-140.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Staneck W., "Internal and External Media" Electronic Publishing Unleashed, 1995, Chapter 22, pp. 510-542.

Clark James—W3C Editor, "XSL Transformation (XSLT) Verison 1.0" Nov. 16, 1999 W3C (MIT INRIA.Kejo) pp. 1-156.

Description of Whitehill Composer software product producted by Whitehill Technologies Inc. available at <http://www.xml.com/pub/p/221> accessed on Apr. 8 2004, two pages.

McCright J.S.; "New Tool Kit to Link Groove with Microsoft Sharepoint" eWeek Enterprise News & Reviews Ziff Davis Media INc. Jul. 29, 2002 1 page.

Musgrave S; "Networking technology—Impact and opportunities" Survey and Statistical Computing 1996. Proceedings of the Second ASC International Conference. Sep. 1996. pp. 369-378. London UK.

Rapaport L; "Get more from SharePoint" Transform Magazine vol. 11 No. 3. Mar. 2002 pp. 1315.

W3C Editor James Clark and Ste; "XML Path Language (XPath) Version 1.0" Nov. 16, 1999W3C (MIT INRIA Kejo) pp. 1-49.

OMG XML Metadata Interchange (XMI) Specification Version 1.2 Jan. 2002.

Laura Acklen & Read Gilgen, "Using Corel Wordperfect 9", 251-284, 424-434, 583-586 (1998).

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

LeBlond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/ Mcgraw-Hill 1997 pp. 48-50.

"Microsoft Visual Basic 5.0 Programmer's Guide 1997"; pp. 578-579; Redmond WA 98052-6399.

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Atova, "User Reference manual Version 4.4, XML Spy suite 4.4," Atova Ges.m.b.H and Altova, Inc., May 24, 2002, pages cover, copyright p. 1-565.

Altova et at. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

Altova, Inc., "XML. Spy 4.0 Manual," Altova Inc. & Altova GmbH, coyright 1998-2001, Chapters 1, 2, and 8, encompassing pp. 1-17, 18-90, and 343-362.

Cybook, INC.: "Copying the Search Form to Services-based Web Sites" INternet Article, (online) Jul. 26, 2004. *the whole document*.

Excel Developer Tip (hereinafter "Excel"), "Determining the Data Type of a Cell", May 13, 1998, p. 1 (available at http://jwalk.com/ss//excel/tlps/tip62.htm).

Macromedia, INC.: "Dreamweaver Technote, Changes in copying and pasting in Dreamweaver 4" Internet Article (online). *the whole document*.

Rado, Dave: "How to create a template that makes it easy for users to "fill in the blanks", without doing any programming" Microsoft Word MVP FAQ Site, (online) Apr. 30, 2004, the whole document.

Cover, XML Forms Architecture, retrieved at << http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, pp. 07.

Microsoft Corporation, "Microsoft Computer Dictionary" Microsoft Press, Fifth Edition, p. 149.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press*, (1997),pp. 42-43, 54-58.

"Microsoft Word 2000", Screenshots,(1999),1-5.

Beauchemin, Dave , "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Borland, Russo , "Running Microsoft Word 97", 314-315, 338, 361-362, 390, and 714-719.

Brabrand, et al., "Power Forms Declarative Client-side Form Field Validation", (2002),1-20.

Dubinko, Micah , "XForms and Microsoft InfoPath", Retrieved from the Internet at http://www.xml.com/lpt/a/1311 on Jan. 21, 2007,(Oct. 29, 2003).

Hoffman, Michael , "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Lehtonen, Miro , et al., "A Dynamic User Interface for Document Assembly", Department of Computer Science, University of Helsinki,(Nov. 2002).

Nelson, Joe , "Client-side Form Validation Using JavaScript", *Developer Advisory*, (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond University, Australia,(2001).

Singh, Darshan , "Microsoft InfoPath 2003 By Example", Retrieved from the Internet at http://www.perfectxml.com/InfoPath.asp on Jan. 21, 2007,(Apr. 20, 2003).

Udell, Jon , "InfoPath and XForms", Retrieved from the Internet at http://weblog.infoworld.com/udell/2003/02/26.html,(Feb. 26, 2003).

Anat, Eyal et al., "Integrating and Customizing Hereregeneous E-Commerce Applications", The VLDB Journal-The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2007,(May 2002),25 pages.

Altova, et al., "User and Reference Manual Version 4.4", www.xmlspy.com, (May 24, 2007),1-565.

"XForm 1.0", W3C,(Jul. 16, 2001).

Grosso, et al., "XML Fragment Interchange", W3C,(Feb. 2001),1-28.

"Microsoft Word 2000 Screenshots", (2000),11-17.

XMLSPY, "XmlSpy 2004 Enterprise Edition Manual", Altova,(May 17, 2004),1-25, 220-225.

STYLUSSTUDIO, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12.

"Microsoft Word 2000 Screenshots", Word,(2000),1-17.

Pacheco, Xavier et al., "Delphi 5 Developer's Guide", Sams Publishing. Chapter 31, Section: Data Streaming,(1999),4.

Hu, et al., "A Programmable Editor for Developing Structured Documents based on Bidirectional Transformations", ACM,(Aug. 2004),178-179.

Bradley, Neil "The XML Companion, Third Edition", *Published by Addison Wesley Professional*, http://proquest.safaribooksonline.com0201770598, http,(Dec. 12, 2001), 1-18.

Klarlund, Nils "DSD: A Schema Language for XML", *ACM, FSMP Portland Oregon*, (2000),101-111.

Watt, Andrew "Microsoft Office Infopath 2003 Kick Start", (*Published by Sams*)Print ISBN-10:0-672-32623-X, (Mar. 24, 2004), 1-57.

Kay, Michael "XSL Transfornmations (XSLT) Version 2.0", http://www.w3.org/TR/2005/WD-xslt20-20050404, (04/205),1-374.

"Notice of Allowance", U.S. Appl. No. 10/404,312, (Jan. 12, 2009),12 pages.

"Non Final Office Action", U.S. Appl. No. 10/977,198, (Feb. 2, 2009),15 pages.

"Non Final Office Action", U.S. Appl. No. 10/939,588, (Feb. 18, 2009),40 pages.

"Non Final Office Action", U.S. Appl. No. 10/976,451, (Feb. 23, 2009),39 pages.

"Non final Office Action", U.S. Appl. No. 11/234,767, (Feb. 26, 2009),37 pages.

"Notice of Allowance", U.S. Appl. No. 11/167,514 (Mar. 11, 2009),6 pages.

"Non Final Office Action", U.S. Appl. No. 10/942,528, (Mar. 6, 2009),31 pages.
"Non Final Offfice Action", U.S. Appl. No. 11/170,521, (Jan. 21, 2009),86 pages.
"Foreign Office Action", Application Serial No. 2,412,611, (Feb. 9, 2009),6 pages.
"Foreign Office Action", Application Serial No. 200610003709.2, (Jan. 9, 2009),8 pages.
"EP Office Action", Application Serial No. 06111546.5, (Oct. 15, 2008),5 pages.
"Notice of Re-Examination", Application Serial No. 01813138.7, (Mar. 11, 2009),27 pages.
"Foreign Office Action", Application Serial No. 2002-503702, Final Notice of Rejection,(Jun. 5, 2009),212 pages.
"Foreign Office Action", Application Serial No. 200610051554.X, (Jul. 10, 2009),11 pages.
Kaori, Iwantani et al., "Perfect Manual of Clarisworks 4.0 for Macintosh", 1st Edition, Japan,(Jul. 22, 1997),pp. 153-167.
Noriko, Matsushita "Step-up Training of Clarisworks (tabulation), Successful Use of Spreadsheet and Tabulation", Mac People, vol. 4, No. 19,(Oct. 1, 1998),pp. 138-139.
Akihiro, Senda "Word 2000, Conservative-Looking but 'Attentive' New Function", NIKKEI PC 21, vol. 4, No. 8,(Aug. 1, 1999),pp. 115-116.
Yasuji, Fukuhara "Clarisworks, Introduction to Business Document Construction, No. 4, Estimate", NIKKEI MAC, No. 14,(May 17, 1994),pp. 197-204.
Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999), 182 pages.
Acklen, et al., "Using Corel WordPerfect 9", Que Corporation,,(1998),pp. 251-284, 424-434, 583-585.
"Notice of Allowance", U.S. Appl. No. 10/988,718, (Apr. 9, 2009),17 pages.
"Final Office Action", U.S. Appl. No. 11/107,347, (Apr. 2, 2009),15 pages.
"Restriction Requirement", U.S. Appl. No. 11/227,550, (Apr. 2, 2009),8 pages.
"Non Final Office Action", U.S. Appl. No. 10/955,665, (Apr. 2, 2009),19 pages.
"Non Final Office Action", U.S. Appl. No. 10/988,720, (Apr. 2, 2009),19 pages.
"Final Office Action", U.S. Appl. No. 11/203,818, (Apr. 14, 2009),31 pages.
"Final Office Action", U.S. Appl. No. 11/044,106, (Apr. 13, 2009),20 pages.
"Final Office Action", U.S. Appl. No. 11/226,044, (Apr. 20, 2009),24 pages.
"Final Office Action", U.S. Appl. No. 11/056,500, (Apr. 16, 2009),10 pages.
"Final Office Action", U.S. Appl. No. 11/203,937, (May 7, 2009),13 pages.
"Non Final Office Action", U.S. Appl. No. 10/955,666, (May 7, 2009),28 pages.
"Non Final Office Action", U.S. Appl. No. 10/876,433, (Apr. 24, 2009),62 pages.
"Non Final Office Action", U.S. Appl. No. 10/916,692, (Apr. 30, 2009),14 pages.
"HP Blade Server BH Series Operating System Guide", Hewlett-Packard,(Jul. 2002).
"Non Final Office Action", U.S. Appl. No. 09/599,809, (May 13, 2009),25 pages.
"Non Final Office Action", U.S. Appl. No. 11/295,178, (May 27, 2009),111 pages.
"Non Final Office Action", U.S. Appl. No. 10/990,152, (May 28, 2009),19 pages.
"Final Office Action", U.S. Appl. No. 11/036,910, (Jun. 1, 2009),15 pages.
"Non Final Office Action", U.S. Appl. No. 11/095,254, (Jun. 8, 2009),21 pages.
"Final Office Action", U.S. Appl. No. 11/234,767, (Jun. 10, 2009),24 pages.

"Final Office Action", U.S. Appl. No. 10/976,451 (Jul. 2, 2009), 22 pages.
Reagan, Moore W., et al., "Collection-based persistent digital archives", U.S. Appl. No. 60/191,662, filed Mar. 23, 2000, 133.
"Non-Final Office Action", U.S. Appl. No. 11/227,550, (Aug. 3, 2009),45 pages.
"Notice of Allowance", U.S. Appl. No. 11/203,937, (Aug. 3, 2009),107 pages.
"Non-Final Office Action", U.S. Appl. No. 11/234,767, 150 Pages.
"Final Office Action", U.S. Appl. No. 10/977,198, (Aug. 19, 2009),15 pages.
"Non-Final Office Action", U.S. Appl. No. 10/939,588, (Aug. 27, 2009),28 pages.
"Final Office Action", U.S. Appl. No. 11/170,521, (Sep. 8, 2009),12 pages.
"Final Office Action", U.S. Appl. No. 10/402,640, (Aug. 28, 2009),17 pages.
"Notice of Allowance", U.S. Appl. No. 11/203,937, Supplemental,(Sep. 15, 2009),2 pages.
"Final Office Action", U.S. Appl. No. 10/942,528, (Sep. 17, 2009),27 pages.
"Non-Final Office Action", U.S. Appl. No. 11/107,347, (Sep. 17, 2009),9 pages.
"Notice of Allowance", U.S. Appl. No. 10/988,720, (Sep. 17, 2009),18 pages.
"Non-Final Office Action", U.S. Appl. No. 11/044,106, (Sep. 24, 2009),17 pages.
"Notice of Allowance", U.S. Appl. No. 11/203,937, (Aug. 31, 2009),2 pages.
"Non-Final Office Action", U.S. Appl. No. 11/567,149, (Sep. 8, 2009),5 pages.
"Final Office Action", U.S. Appl. No. 10/955,666, (Oct. 14, 2009),24 pages.
"Advisory Action", U.S. Appl. No. 10/942,528, (Oct. 26, 2009),3 pages.
"Non-Final Office Action", U.S. Appl. No. 11/557,931, (Oct. 20, 2009),27 pages.
"Non-Final Office Action", U.S. Appl. No. 10/976,451, (Oct. 29, 2009),14 pages.
WEBOPEDIA, "Definition of OLE", Retrieved from: <http://www.webopedia.com/TERM/O/OLE.html>, cited by examiner,(May 16, 1998), 3 pages.
WEBOPEDIA, "Definition of OpenDoc", Retrieved from: <http://www.webopedia.com/TERM/O/OpenDoc.html>, cited by examiner,(Sep. 18, 1997),3 pages.
WEBOPEDIA, "Definition of Network", Retrieved from: <http://www.webopedia.com/TERM/n/network.html>, cited by examiner,(Sep. 1, 1996),2 pages.
"Non-Final Office Action", U.S. Appl. No. 10/402,640, (Apr. 30, 2010),4 pages.
"Final Office Action", U.S. Appl. No. 11/227,550, (Jan. 19, 2010),12 pages.
"Final Office Action", U.S. Appl. No. 11/234,767, (Jan. 26, 2010),23 pages.
"Final Office Action", U.S. Appl. No. 11/295,178, (Dec. 24, 2009),38 pages.
"Foreign Office Action", Application Serial No. 200610051544.X, (Dec. 4, 2009),9 pages.
"Non-Final Office Action", U.S. Appl. No. 10/402,640, (Dec. 30, 2009),16 pages.
"Non-Final Office Action", U.S. Appl. No. 11/170,521, (Dec. 17, 2009),11 pages.
"Non-Final Office Action", U.S. Appl. No. 11/218,149, (Jan. 14, 2010),15 Pages.
"Non-Final Office Action", U.S. Appl. No. 12/021,894, (Dec. 31, 2009),10 pages.
"Notice of Allowance", U.S. Appl. No. 10/955,665, (Dec. 30, 2009),2 pages.
"Notice of Allowance", U.S. Appl. No. 10/990,152, (Dec. 21, 2009),6 pages.
"Notice of Allowance", U.S. Appl. No. 11/872,703, (Jan. 27, 2010),19 pages.

Honkala, Mikko et al., "Multimodal Interaction with XForms", *ICWE '06*, (2006),pp. 201-208.

"Architecture for a Dynamic Information Area Control", IBM Technical Disclosure Bulletin, IBM Corp, NY, US vol. 37, No. 10, Jan. 10, 1994, pp. 245-246.

"Copying the Search Form to Custom Pages in Windows SharePoint Services-based Web Sites", *CyBOOK, Inc.*, Jul. 26, 2004, Internet Article,(2004),1 page.

"Excel Developer Tip: Determining the Data Type of a Cell", Retrieved from <http://jwalk.com/ss/excel/tips/tip62.htm>, (May 13, 1998),1 page.

"Foreign Notice of Allowance", Mexican Application No. PA/a/2005/012067, (Nov. 13, 2009),3 pages.

"Netscape Communicator 4.61 for OS/2 Warp", Netscape Communication Corporation, Software 1999, The Whole software release & Netscape—Version 4.61 {en}—010615, Netscape Screenshot,(Oct. 2, 2002),1 page.

"Notice of Allowance", U.S. Appl. No. 11/072,087, (Feb. 23, 2010),4 pages.

"OMG XML Metadata Interchange (XMI) Specification", Retrieved from: <http://www.omg.org/cgi-bin/doc?formal/02-01-01.pdf> on Dec. 2, 2009, Version 1.2,(Jan. 2002),268 pages.

"SmartUpdate Developer's Guide", Retrieved from http://developer.netscapte.com:80/docs/manuals/communicator/jarman/index.htm on Dec. 8, 2000, Netscape Communications Corp,(Mar. 11, 1999),83 pages.

"Stack Algorithm for Extracting Subtree from Serialized Tree", *IBM Technical Disclosure Bulletin*, TDB-ACC-No. NN94033, (Mar. 1, 1994),2 pages.

"Store and Organize Related Project Files in a Binder", Getting results with Microsoft Office,(1990),pp. 109-112.

"Streamlining Content Creation", Ixia Soft Jun. 6, 2002,pp. 1-16.

"Supplemental Notice of Allowance", U.S. Appl. No. 10/955,665, (Feb. 4, 2010),2 pages.

"Supplemental Notice of Allowance", U.S. Appl. No. 10/955,665, (Nov. 27, 2009),2 pages.

"Validation with MSXML and XML Schema" *Windows Developer Magazine*, (Jan. 1, 2002),5 pages.

"Whitehill Composer Software product", Retrieved from www.xml.com/pub/p/221 on Apr. 8, 2004, Whitehill Technologies, Inc.,(Apr. 8, 2004),2 pages.

"XML Forms Architecture (XFA)", Retrieved from http://xml.coverpages.org/xfa.html on Aug. 17, 2006, Cover Pages Technology Reports,,(Jun. 16, 1999),p. 1.

Alschuler, Liora "A Tour of XMetal", Retrieved from: <http://www.xml.com/pub/a/SeyboldReport/ip031102.html> on Feb. 5, 2003, XML.com, Online! XPOO2230081,(Jul. 14, 1999),3 pages.

Altova, "XML Spy 4.0 Manual", *1998-2001 Altova Inc. & Altova GmbH*, (Sep. 10, 2001),pp. 1-90, 343-362.

Altova, et al., "XML Spy, XML Integrated Development Environments", Altova Inc.,(2002),pp. 1-18.

Au, Irene et al., "Netscape Communicator's Collapsible Toolbars", CHI 98, Human Factors in Computing Systems, Conference Proceedings, LA, CA,(Apr. 18-23, 1998),pp. 81-86.

Barker, et al., "Creating In-Line Objects Within an Integrated Editing Environment", IBM Technical Disclosure Bulletin, vol. 27, No. 5,(Oct. 1984),p. 2962.

Battle, Steven A., et al., "Flexible Information Presentation with XML", *The Institution of Electrical Engineers*, (1998),6 pages.

Ben-Natan, Ron et al., "Internet Platform for Creating and Supporting Communities", U.S. Appl. No. 60/203,081, filed May 9, 2000,31 pages.

Berg, A "Naming and Binding: Monikers", *Inside OLE, Chapter 9, Harmony Books*, (1995),pp. 431-490.

Brogden, William "Arbortext Adept 8 Editor Review", Retrieved from: <www.xml.com/pub/a/1999/09/adept/AdeptRvw.htm> on Feb. 5, 2003, O'Reilly XML.COM, Online!,(Sep. 22, 1999)4 pages.

Chen, Ya B., et al., "Designing Valid XML Views", S. Spaccapietra, S.T. March, and Y. Kambayashi (Eds.): *ER 2002, LNCS 2503*, Copyright: Springer-Verlag Berlin Heidelberg 2002,pp. 463-477.

Chen, Yi et al., "XKvalidator: A Constraint Validator for XML", *CIKM '02*, Nov. 4-9, 2002, McLean, VA, USA, Copyright 2002, ACM, ISBN 1-58113-492-4/02/0011,(Nov. 4-9, 2002),pp. 446-452.

Chien, et al., "Efficient Management of Multiversion Documents by Object Referencing", Proceedings of the 27th VLDB Conference,(2001),pp. 291-300.

Chien, Shu-Yao et al., "Efficient Schemes for Managing Multiversion XML Documents", *The VLDB Journal 2002*, (Dec. 19, 2002),pp. 332-353.

Chien, Shu-Yao et al., "Storing and Querying Multiversion XML Documents using Durable Node Numbers", IEEE,(2002),pp. 232-241.

Chien, Shu-Yoa et al., "XML Document Versioning", SIGMOD Record, vol. 30, No. 3,(Sep. 2001),pp. 46-53.

Chuang, Tyng-Ruey "Generic Validation of Structural Content with Parametric Modules", *ICFP 2001 International Conference on Functional Programming*, vol. 36, No. 10, Available at <http://citeseerx.ist.psu.edu/viewdoc/download?doi=10.1.1.7.6412&rep=rep1&type=pdf>,(Sep. 3, 2001),12 pages.

Ciancarini, Paolo A., et al., "Managing Complex Documents Over the WWW: A Case Study for XML", *Transactions on Knowledge and Data Engineering*, vol. 11, No. 4, Available at <http://citeseerx.ist.psu.edu/viewdoc/download?doi=10.1.1.18.1679&rep=rep1&type=pdf>,(Apr. 1999),pp. 1-14.

Clapp, D "The NeXT Application Kit Part 1: Non-Responsive Classes", *The NeXT Bible Chapter 16*, (1990),pp. 275-293.

Clark, James "XSL Transformation (XSLT), Version 1.0", Retrieved from: <www.w3.org/TR/1999/REC-xslt19991116> on Oct. 26, 2009, WC3,(Nov. 16, 1999),57 pages.

Clark, James et al., "XML Path Language (XPath)", Retrieved from: <www.w3.org/TR/1999/RCE-xpath-19991116> on Oct. 26, 2009, Version 1.0,(Nov. 16, 1999),37 pages.

Clark, Peter "From Small Beginnings", *Knowledge Management*, (Nov. 2001),pp. 28-30.

Cover, Robin "XML Forms Architecture (XFA)", Cover Pages. Retrieved from "http://xml.coverpages.org/xfa.html" on Aug. 17, 2006, (Apr. 19, 2000),4 pages.

Davidow, Ari "XML Editors: Allegations of Functionality in Search of Reality", Retrieved from: <http://www.ivritype.com/xml/> on Feb. 9, 2009, SP002230082,(Oct. 12, 1999),16 pages.

Dayton, Linnea et al., "Photo Shop 5/5.5 WOW! Book", 2000, *Peachpit Press*, (2000),pp. 8-17.

Dilascia, Paul et al., "Sweeper", *Microsoft interactive developer*, vol. 1., No. 1, (1996),pp. 16-52.

Dorward, Sean et al., "Unix Variants", *Unix Review*, vol. 10, No. 4, (Apr. 1992),pp. 29-31.

Dyck, Timothy "XML Spy Tops as XML Editor" *eWeek*, vol. 19, No. 47,,(Nov. 25, 2002),3 pages.

Halberg, et al., "Using Microsoft Excel 97", Que Corporation,,(1997),pp. 1-9, 18-25, 85-89, 98-101, 106-113, 124-127, 144-147, 190-201, 209-210, 213-227, 581-590, 632-633, 650-655, 712-714.

Han, Richard et al., "Websplitter: A Unified XML Framework for Multi-Device Collaborative Web Browsing", *ACM Conference on Computer Supported Cooperative Work*, (2000), 10 pages.

Hardy, Matthew R., et al., "Mapping and Displaying Structural Transformations between XML and PDF", *Proceedings of the 2002 ACM symposium on Document engineering*, (Nov. 8-9, 2002),pp. 95-102.

Haukeland, Jan-Henrick "Tsbiff-tildeslash biff—Version 1.2.1", http://web.archive.org/web/19990912001527/http://www.tildeslash.com/tsbiff/., (Jun. 1999),2 pages.

Herzner, Wolfgang et al., "CDAM-Compound Document Access and Management. An Object-Oriented Approach" *ACM SIGOIS Bulletin*, vol. 12 , Issue 1, MultiMedia Systems Interaction and Applications, Chapter 3,,(Jul. 1991), 18 pages.

Hwang, Kai et al., "Micro-Firewalls for Dynamic Network Security with Distributed Intrusion Detection", *IEEE International Symposium on Network Computing and Applications 2001*, (2001),pp. 68-79.

Kaiya, Haruniko et al., "Specifying Runtime Environments and Functionalities of Downloadable Components under the Sandbox Model", *International Symposium on Principles of Software Evolution 2000*, (2000),pp. 138-142.

Kanemoto, Hirotaka et al., "An Efficiently Updatable Index Scheme for Structured Documents", *DEXA'98*, (1998),pp. 991-996.

Kim, Sang-Kyun et al., "Immediate and Partial Validation Mechanism for the Conflict Resolution of Update Operations in XML Databases", *WAIM 2002, LNCS 2419, 2002, Springer-Verlag Berlin Heidelberg*, (2002),pp. 387-396.

Kobayashi, M. et al., "An Update on BTRON-specification OS Development", *Proceedings of the 8thTRON Project Symposium, 1991*, 0-8186-2475-2/91,(1991),pp. 132-140.

Komatsu, Naohisa et al., "A Proposal on Digital Watermark in Document Image Communication and It's Application to Realizing a Signature", *Electronics and Communication in Japan, Part I: Communications*, vol. 73, No. 5, (May 1990),pp. 22-33.

Kutay, Ali et al., "Methods and Systems for Accessing, Organizing, Presenting and Viewing Data", U.S. Appl. No. 60/209,713, Kutay et al., filed Jun. 5, 2000,345 pages.

Leblond, et al., "PC Magazine Guide to Quattro Pro for Windows", Ziff-Davis Press,(1993),pp. 9-11, 42-61.

Mansfield, Ron "Excel 97 for Busy People", Osborne/McGraw-Hill,,(Jan. 27, 1997),pp. 48-50.

McCright, John S., "New Tool Kit to Link Groove with Microsoft SharePoint", Retrieved from: <http://www.eweek.com/c/a/Enterprise-Applications/New-Tool-Kit-to-Link-Groove-With-Microsoft-SharePoint/> on Dec. 28, 2009, (Jul. 29, 2002),3 pages.

Musgrave, S "Networking Technology—Impact and Opportunities", *Survey and Statistical Computing 1996, Proceedings of the Second ASC International Conference*, London, UK,, (Sep. 1996),pp. 369-378.

Noore, Afzel "A Secure Conditional Access System using Digital Signature and Encryption", *International Conference on Consumer Electronics*, (Jun. 2003),pp. 220-221.

Pike, Rob et al., "Plan 9 From Bell Labs", AT&T Bell Laboratories, UKUUG, Summer 1990,(1990),10 pages.

Pike, Rob et al., "The Use of Name Spaces in Plan 9", *Operating Systems Review*, vol. 27, No. 2, (Apr. 1993),pp. 72-76.

Prevelakis, Vassilis et al., "Sandboxing Applications", *FREENIX Track: 2001 USENIX Annual Technical Conference*, (2001),pp. 119-126.

Rado, Dave "How to create a template that makes it easy for users to 'fill in the blanks' without doing any programming,", Retrieved from http://word.mvps.org/FAQs/Customization/FillinTheBlanks.htm, (Apr. 2004),pp. 1-2.

Raggett, "HTML Tables", Retrieved from: <http:www.//is-edu.homuns.edu.vn/WebLib/books/Web/Tel/html3-tables.html> on Aug. 6, 2006, W3C Internet Draft,(Jul. 7, 1995),pp. 1-12.

Rapaport, Lowell "Get More From SharePoint", *Transform Magazine*, vol. 11, No. 3, (Mar. 2002),2 pages.

Rogge, Boris et al., "Validating MPEG-21 Encapsulated Functional Metadata", *IEEE 2002*, ISBN 0-7803-7304-9/02,(2002),pp. 209-212.

Schmid, Mathew et al., "Protecting Data from Malicious Software", *18th Annual Security Applications Conference*, (2002),pp. 199-208.

Staneck, W "Internal and External Media", Electronic Publishing Unleashed, Chapter 22,,(1995),pp. 510-542.

Sun, Q et al., "A Robust and Secure Media Signature Scheme for JPEG Images", Proceeding of 2002 IEEE Workshop on Multimedia Signal Processing,(Dec. 2002),pp. 296-299.

Sutanthavibul, Supoj et al., "XFIG Version 3.2 Patchlevel 2 (Jul. 2, 1998) Users Manual (Edition 1.0)", Retrieved from: <www.ice.mtu.edu/online_docs/sfig332/> on Jan. 28, 2003, Internet Document XP002229137,(Jul. 2, 1998),60 pages.

Tomimori, Hiroyuki et al., "An Efficient and Flexible Access Control Framework for Java Programs in Mobile Terminals", Proceeding of 22nd Int'l Conference on Distributed Computing Systems Workshops,(2002),pp. 777-782.

Trupin, J "The Visual Programmer", Microsoft Systems Journal,(Apr. 1996),pp. 103-105.

Usdin, Tommie et al., "XML: Not a Silver Bullet, But a Great Pipe Wrench", *Standard View* vol. 6, No. 3, (Sep. 2, 1998),pp. 125-132.

Varlamis, Iraklis et al., "Bridging XML-Schema and relational database. A System for generating and manipulating relational databases using valid XML documents", DocEng 01, ACM 1-58113-432-0/01/0011,(Nov. 9-10, 2001),pp. 105-114.

Williams, Sara et al., "The Component Object Model: A Technical Overview", Microsoft Corp,(Oct. 1994),pp. 1-14.

Wong, Raymond K., et al., "Managing and Querying Multi-Version XML Data with Update Logging", *DocEng '02*, (Nov. 8-9, 2002),8 pages.

Zdonik, S "Object Management System Concepts", ACM,(1984),pp. 13-19.

"Final Office Action", U.S. Appl. No. 11/107,347, (Mar. 22, 2010), 11 pages.

"Non-Final Office Action", U.S. Appl. No. 10/916,692, (Apr. 5, 2010), 6 pages.

"Non-Final Office Action", U.S. Appl. No. 10/976,451, (Apr. 9, 2010), 11 pages.

"Non-Final Office Action", U.S. Appl. No. 11/227,550, (Mar. 10, 2010), 12 pages.

"Notice of Allowance", U.S. Appl. No. 10/939,588, (Mar. 10, 2010), 10 pages.

"Notice of Allowance", U.S. Appl. No. 11/044,106, (Mar. 15, 2010), 7 pages.

"Supplemental Notice of Allowance", U.S. Appl. No. 10/955,665, (Mar. 5, 2010), 2 pages.

"Supplemental Notice of Allowance", U.S. Appl. No. 10/990,152, (Apr. 19, 2010), 2 pages.

"Supplemental Notice of Allowance", U.S. Appl. No. 11/072,087, (Apr. 19, 2010), 2 pages.

Van Hoff, Arthur et al., "The Open Software Description Format", Retrieved from: <www.w3.org/TR/NOTE-OSD> on May 18, 2009, (Aug. 13, 1997),10 pages.

"Notice of Allowance", U.S. Appl. No. 10/955,665, (Nov. 3, 2009), 8 pages.

"Final Office Action", U.S. Appl. No. 10/916,692, (Nov. 16, 2009), 10 pages.

"Final Office Action", U.S. Appl. No. 11/218,149, (Nov. 16, 2009), 18 pages.

"Final Office Action", U.S. Appl. No. 11/072,087, (Nov. 16, 2009), 9 pages.

"Non-Final Office Action", U.S. Appl. No. 11/036,910, (Nov. 13, 2009), 9 pages.

"Notice of Allowance", U.S. Appl. No. 11/095,254, (Nov. 18, 2009), 8 pages.

"Foreign Office Action", Mexican Patent Application No. PA/a/2006/002493, (Sep. 14, 2009), 5 pages.

"Notice of Allowance", U.S. Appl. No. 10/942,528, (Dec. 3, 2009), 8 pages.

"Notice of Allowance", U.S. Appl. No. 11/056,500, (Dec. 2, 2009), 17 pages.

"Final Office Action", U.S. Appl. No. 11/036,910, (May 26, 2010),9 pages.

"Final Office Action", U.S. Appl. No. 11/218,149, (May 19, 2010),17 pages.

"Foreign Office Action", Australian Patent Application No. 2006200285, (May 20, 2010),2 pages.

"Foreign Office Action", Russian Application No. 2006103267, (Apr. 20, 2010),10 pages.

"Foreign Office Action", Russian Application No. 2006105526, (Apr. 15, 2010),10 pages.

"Non-Final Office Action", U.S. Appl. No. 11/295,178, (May 26, 2010),45.

"Non-Final Office Action", U.S. Appl. No. 11/567,140, (May 18, 2010),8 pages.

"Notice of Allowance", U.S. Appl. No. 11/557,931, (May 5, 2010),7 pages.

"Notice of Allowance", U.S. Appl. No. 11/872,703, (May 14, 2010),18 pages.

"Supplemental Notice of Allowance", U.S. Appl. No. 11/044,106, (May 13, 2010),6 pages.

"Supplemental Notice of Allowance", U.S. Appl. No. 11/044,106, (May 19, 2010),5 pages.

* cited by examiner

| | Permitted Trust Level 604 | Full Trust Requested 606 | Location-Dependent Trust Requested 608 | Restricted Trust Requested 610 |
|---|---|---|---|---|
| 302 | Full Trust | Deploy at Full Trust | N/A | N/A |
| 502 | Location-Dependent: Local | Fail to Execute | Execute at Local | Execute at Restricted |
| 504 | Location-Dependent: Intranet | Fail to Execute | Execute at Intranet | Execute at Restricted |
| 506 | Location-Dependent: Internet | Fail to Execute | Execute at Internet | Execute at Restricted |
| 306 | Restricted | Fail to Execute | Fail to Execute | Execute at Restricted |

Fig. 6

EXECUTING APPLICATIONS AT APPROPRIATE TRUST LEVELS

TECHNICAL FIELD

This invention relates to executing applications.

BACKGROUND

Executing applications deployed from remote sources can be dangerous. Applications from remote sources may contain malicious code like worms or viruses that can damage or misuse a user's computer or information.

To partially combat this problem, typical Internet browsers can execute an application published to a remote location (e.g., an Internet domain) with a trust level predetermined for that location. Applications executed at a high trust level are permitted to perform riskier operations than those executed at a low trust level. Trust levels used by these Internet browsers are typically set prior to running the application based on how trustworthy the remote location is deemed to be. To execute applications with these Internet browsers, however, a user typically must have access to the remote location, such as via the Internet.

If a user wants to execute an application published to a remote location for later use when he or she will not have remote access, the user can save the application onto his or her local machine. The user can then later execute the application when he or she does not have remote access. There is a significant danger in doing so, however. The application may not execute at an appropriate trust level when executed from the user's local machine. This is because applications loaded from a local machine typically execute with a higher trust that is assigned to the local machine.

Similarly, if a user wants to execute an application that is not published to—but does originate from—a remote location, the user can save the application onto his or her local machine. The user can then execute the application but it may execute at an inappropriate trust level. One common example of this is when applications are received via email or floppy disk. While the user can run these applications, to do so the user typically saves the application to his or her local machine, often implicitly granting the application a higher trust level than it deserves.

In these and other cases where an application is received from a remote source and saved locally, the trust level at which the application is executed can be too high or too low. This is because many computer systems assume a particular level of trust (usually too high) for applications cached or executed from a local source. This potentially endangers a user's computer and, importantly, personal or corporate information.

Assume, for example, that Joe emails Jane an application and Jane saves the application onto her local machine. By so doing Jane can execute the application from her local machine. When Jane executes the application from her local machine, however, her computer typically assumes a trust level based on the location from which the application was executed (locally), which is often inappropriate. If the application contains malicious code, when Jane executes the application from her local machine it may damage her computer, steal information, and the like.

Similarly, if Jane saves locally an application from a web-site and later executes it, the application is typically granted too high a trust level. If it is granted too high a trust level the application is executed at the higher, inappropriate trust level, thereby endangering her computer and its information.

Further, even if the application Jane runs is not given too high a trust level, but just a different trust level than that at which it will optimally execute, the application may perform inconsistently or otherwise operate poorly.

Thus, typical trust levels granted in executing applications locally that originate from remote sources are often too high or too low, either potentially endangering a user's computer or sacrificing consistent and/or robust operation of the application.

SUMMARY

This patent application describes systems and methods ("tools") enabling execution of applications at appropriate trust levels. These tools can determine appropriate trust levels by comparing applications' permitted trust levels with their requested trust levels.

These tools can determine and embed requested trust levels into applications. The requested trust levels can permit or minimally permit operations capable of being performed by the applications.

To determine permitted trust levels, these tools can compare applications' execution locations with their published locations. The applications can then be executed at these permitted trust levels or at lower trust levels if the applications request lower trust levels. These tools can also disallow execution of applications that will not run safely and robustly, such as when an application requests a higher trust level than is permitted.

These tools also allow applications to be executed at appropriate trust levels when those applications are received from remote sources, such as through email or floppy disks. Regardless of from where applications are received, the tools can enable execution of these applications at appropriate trust levels.

Also, these tools can execute applications at a restricted trust level. Applications executed at this restricted trust level can be prohibited from performing operations capable of endangering a user's computer or information.

BRIEF DESCRIPTION OF THE DRAWINGS

FIG. 6 illustrates an exemplary table showing appropriate, permitted, and requested trust levels.

The same numbers are used throughout the disclosure and figures to reference like components and features.

DETAILED DESCRIPTION

Overview

This patent application describes systems and methods ("tools") for secure execution of applications. Some of these tools can determine operations executable by an application that may damage a computer. Based on this determination or otherwise, these tools can build requested trust levels for applications.

Applications having a requested trust level can be sent from remote locations and received by tools located elsewhere, such as at a user's computer. The tools at the user's computer can determine whether or not to execute these received applications at their requested trust levels. In doing so, these tools can determine permitted trust levels for these applications as well as their requested trust levels. These tools can determine these permitted trust levels based on from where the applications are cached or executed and various information embedded into the application, for instance. In part by comparing the permitted trust levels with the requested trust levels, these tools can execute applications at an appropriate trust level, if one exists.

If, for instance, an application requests a higher trust level than the tools have determined to be permissible, the tools may not execute the application. Here, the tools potentially protect a user's computer from an application that may contain malicious code. Also for instance, if an application requests a trust level identical to that which the tools have determined permissible, the tools can execute the application at the requested trust level. Further, if an application requests a lower trust level than that determined to be permitted, the tools can execute the application at the lower, requested trust level. By so doing, the tools can execute applications at an appropriate trust level.

In cases where a very low trust level is appropriate for an application, the tools can execute the application at a restricted trust level. This trust level enables safe execution of applications that may not be trustworthy.

Exemplary Architecture

Figure 1:
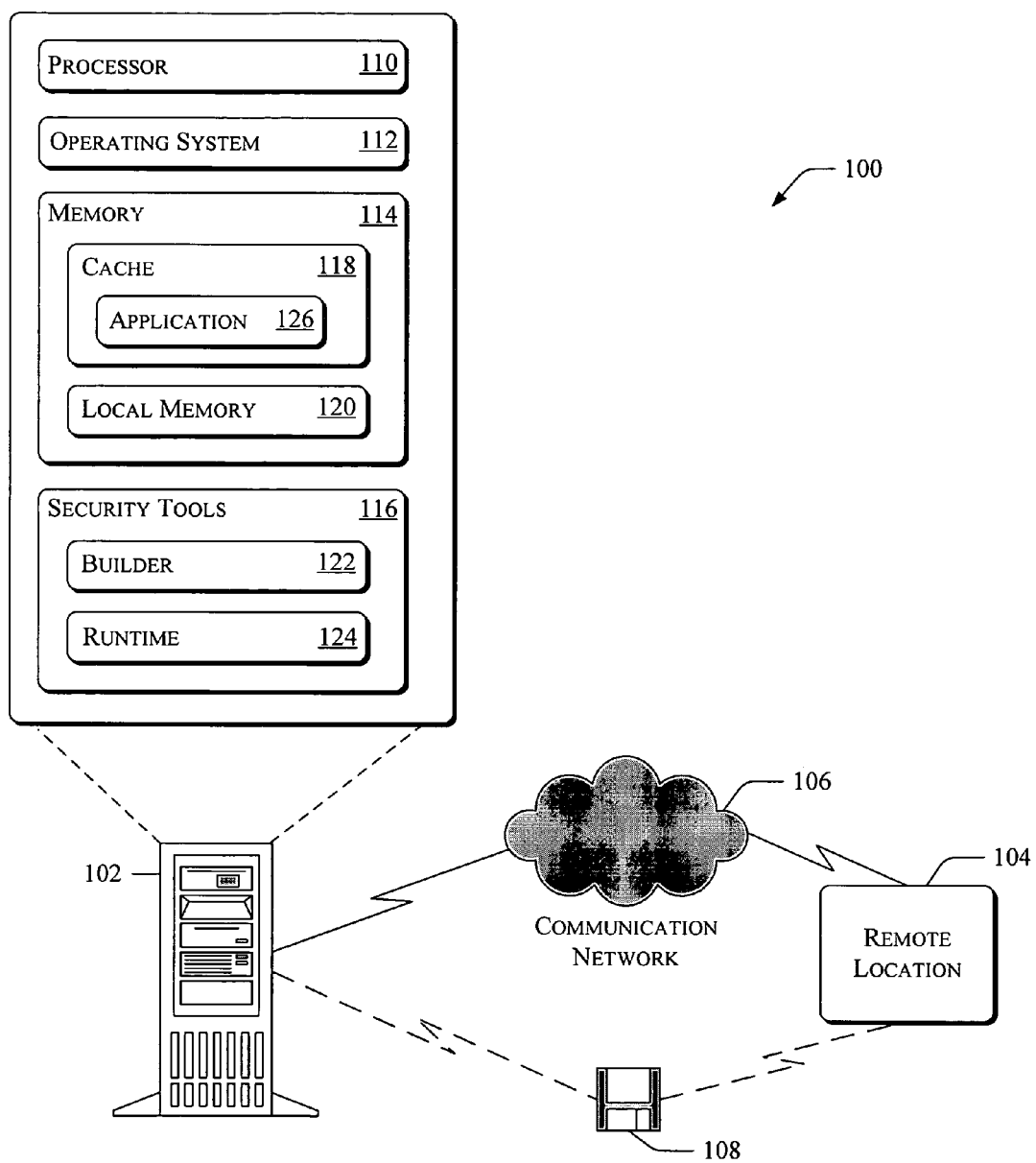
FIG. 1 illustrates an exemplary architecture having security tools.

Referring to FIG. 1, an exemplary architecture 100 is shown having a computing device 102. The computing device 102 is shown capable of communicating with a remote location 104 through a communication network 106 or physical media 108. The remote location 104 can comprise locations at which accessible information is stored, such as computing devices or an Internet domain. The communication network 106 comprises devices or manners by which the computer 102 can send information to, or access information at, the remote location 104. The communication network 106 can comprise, for instance, a global Internet or an intranet. The computing device 102 can, for instance, send applications to, and receive applications from, the remote location 104 through email via the communication network 106. Applications can also be sent and received through physical media 108, such as floppy disks.

The computing device 102 is shown having access to or comprising a processor 110, an operating system 112, a memory 114, and security tools 116. The processor 110 and the operating system 112 are well known and so are not discussed here. The memory 114 can comprise volatile memory and/or non-volatile memory. The memory 114 is shown with a cache 118 and a local memory 120. To aid in discussing various embodiments of the tools 116, the tools 116 are shown having a trust-level builder 122 and a runtime 124. Also to aid in discussing various embodiments, an exemplary application 126 is shown. This application 126 can comprise any compilation of executable code, such as a form template or a word-processing document having a macro. This application 126 can originate, be executed from, and/or be cached from various locations, such as the local memory 120 or the remote location 104.

This architecture 100 and its components are shown to aid in discussing, but are not intended to limit the applicability of, the security tools 116. Other well-known computing systems, environments, and/or configurations that may be suitable for use with the tools 116 comprise, for example, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The tools 116 may be described in the general context of, or implemented with, computer-executable instructions, such as program modules, executed by one or more computers or other devices. Generally, program modules include routines, programs, objects, components, data structures and etc. that perform particular tasks or implement particular abstract data types. The functionality of the program modules may be combined or distributed in various embodiments, including those described below.

These computer-executable instructions can comprise computer-readable media. The computing device 102 can, for instance, comprise computer-readable media, which can be accessed by the tools 116. Computer-readable media can comprise, for example, computer storage media and communication media. Computer storage media includes volatile and nonvolatile, removable and non-removable media implemented in any method or technology for storage of information. This stored information can comprise computer-readable instructions, data structures, program modules, and other data. Computer storage media comprise, by way of example, random access memory (RAM), read-only memory (ROM), electrically erasable programmable read-only memory (EEPROM), flash memory or other memory technology, compact disk read-only memory (CD-ROM), digital versatile disks (DVDs) or other optical storage, magnetic media storage devices, or any other medium that can be used to store the desired information and that can be accessed by the tools 116. Communication media typically embodies computer-readable instructions, data structures, program modules, or other data in a modulated data signal (e.g., a carrier wave or other transport mechanism) and includes any information delivery media. The term "modulated data signal" means a signal that has one or more of its characteristics set or changed in such a manner as to encode information in the signal. Communication media can comprise, for example, wired media, such as a wired network or direct-wired connection, and wireless media, such as acoustic, RF, infrared, and other wireless media. Combinations of any of the above can also be included within the scope of computer-readable media.

Building Requested Trust Levels

Figure 2:
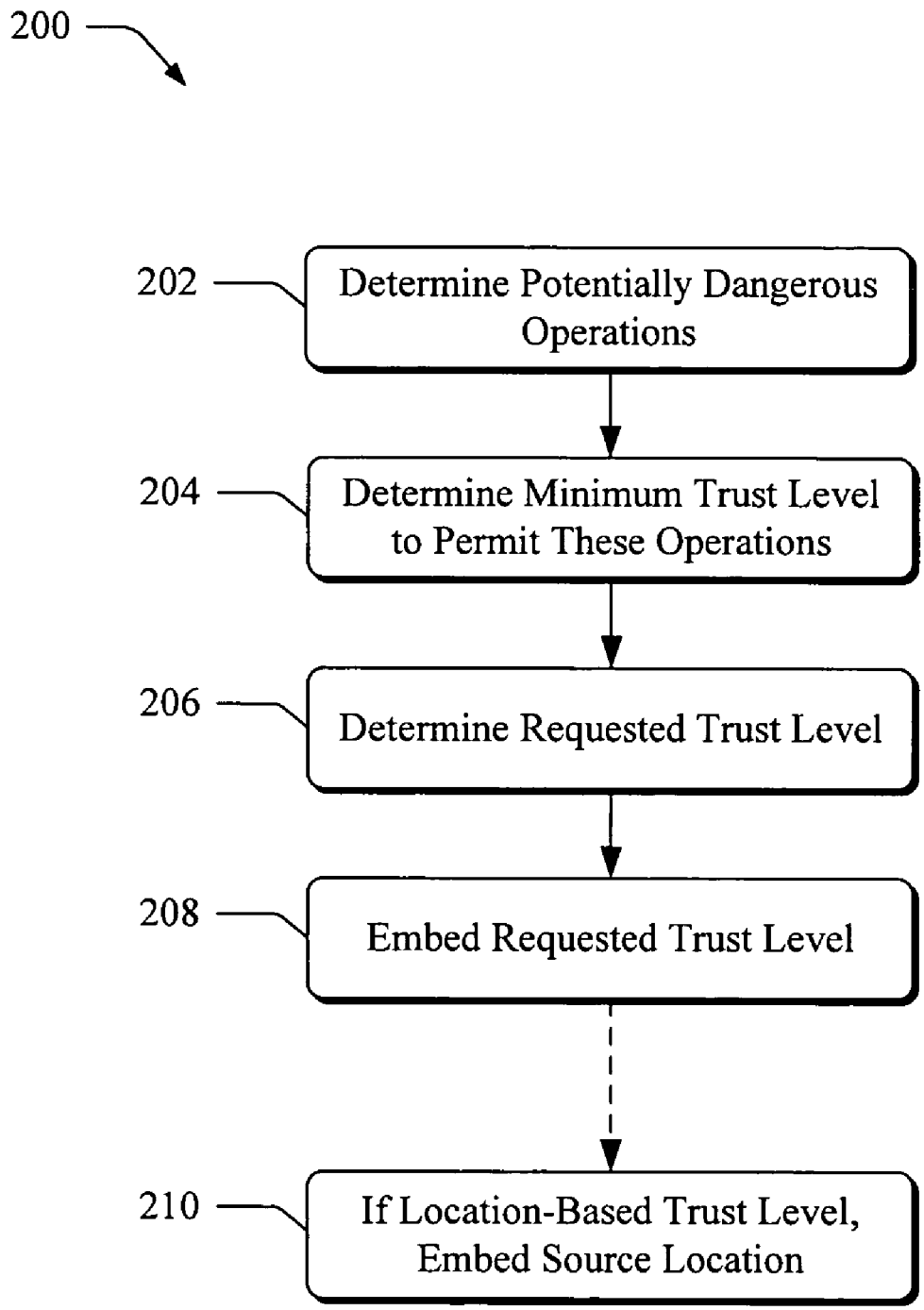
FIG. 2 sets forth a flow diagram of an exemplary process for building requested trust levels.

Referring to FIG. 2, an exemplary process 200 for building requested trust levels is shown. The process 200 is illustrated as a series of blocks representing individual operations or acts performed by the tools 116 and/or the builder 122. This and other processes described herein may be implemented in any suitable hardware, software, firmware, or combination thereof. In the case of software and firmware, these processes represent sets of operations implemented as computer-executable instructions.

The tools 116, through the builder 122, can build requested trust levels for applications and, through the runtime 124, execute these or other applications at an appropriate trust level. The applications, such as the application 126, executed by the runtime 124 may be those having requested trust levels built by the builder 122 or may be received from the remote source 104. Applications received from the remote source 104 may have requested trust levels built by some other builder 122, and so may or may not be trustworthy. For purposes of this description of the process 200, the builder 122 prepares the application 126 for later use, such as by another user at a remote location, by building a requested trust level for that application 126.

Determining Potentially Dangerous Operations Performable By an Application

At block 202, potentially dangerous operations performable by an application are determined. In an ongoing embodiment, the builder 122 analyzes the application 126 to determine what types of operations it can perform that can potentially harm the computing device 102 or compromise its information. The builder 122 can analyze the application 126 by scanning its constituent parts to find links, data sources, web services, and other pieces of code that can indicate a potential compromise to security.

The builder 122 can, for instance, find universal resource locators (URLs) indicating that the application 126 may attempt to communicate with remote locations, such as the remote location 104. How the application 126 intends to communicate can also be ascertained by analyzing code associated with a URL. This associated code can, for example, look information up from or send information to data sources like a database or an Internet site. Similarly, the builder 122 can find code that accesses personal information of the user (such as information stored in the memory 114) and sends it out, such as the user's credit card information sent to a bank website. The builder 122 can also determine that no code of the application 126 can compromise security.

At block 204, a minimum trust level is determined. In the ongoing embodiment, the builder 122 determines a minimum trust level at which the application 126 is permitted to perform the potentially dangerous operations determined at the block 202.

Figure 3:
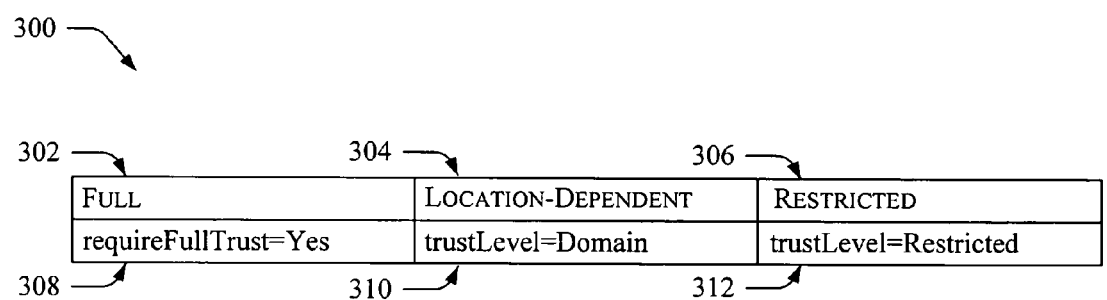
FIG. 3 illustrates an exemplary table of trust levels.

Referring to FIG. 3, an exemplary table 300 of trust levels is shown. In this embodiment, these trust levels comprise, three levels: full trust level 302; location-dependent trust level 304; and restricted trust level 306. Full trust level 302 permits any operation by the application 126. Location-dependent trust level 304 permits operations not requiring full trust 302 by requiring at least one operation that can potentially compromise security. Restricted trust 306 does not permit any potentially security-compromising operations.

If, for example, the builder 122 determines that the application 126 can access, add, alter, or delete information from the memory 114, the builder 122 determines the minimum trust level to be the full trust level 302. If the builder 122 determines that the application 126 can access information from a website, the builder 122 determines the minimum trust level to be the location-dependent trust level 304. If the builder 122 determines that it cannot access any information other than the information it creates, the builder determines the minimum trust level to be the restricted trust level 306.

Setting a Requested Trust Level

At block 206, a requested trust level is set. This requested trust level can be set by a user, such as by the user manually choosing the trust level. In the ongoing embodiment, the requested trust level is the minimum trust level determined by the builder 122 at the block 204.

At block 208, the requested trust level can be embedded into an application. In the ongoing embodiment, the builder 122 embeds the requested trust level into the application 126. The builder 122 can do so by adding code into a configuration setting or another appropriate location of the application 126.

If the application 126 comprises eXtensible Markup Language (XML), the builder 122 can add the XML attributes set forth for the trust levels in the table 300 of FIG. 3.

Referring to FIG. 3, the builder 122 adds the attributes shown in the table 300 to the application 126, based on the requested trust level. The builder 122 can add, for instance, a requested full trust level 302 to the application with the full-trust attribute 308. Here the attribute 308 is: "requireFullTrust=yes". For a requested location-dependent trust level 304, the builder 122 can add the location-dependent attribute 310. Here the attribute 310 is: "trustLevel=Domain". In some embodiments, the attribute 310 can also be "trustLevel=", which can be assumed by the runtime 124 to equate to "trustLevel=Domain" but with "Domain" being a different location than an execution location, discussed below. For a requested restricted trust level 306, the builder 122 can add the restricted attribute 312. Here the attribute 312 is: "trustLevel=Restricted."

At block 210, an application is published to a location. In the ongoing embodiment, if the trust level requested is the location-dependent trust level 304, the builder 122 embeds this published location (e.g., a dependent location URL) information into the application 126. The location-dependent trust level 304 can comprise varying levels of trust, depending on a published location of the application 126 and other factors. These varying levels of trust are described in greater detail as part of the discussion relating to the runtime 124, below.

A published location can be a location from which the application 126 is intended to be executed or cached. For example, if the builder 122 is building a requested trust level for an application that is to be available at a website, the published location for the application can be a URL indicating the domain from which the application can be accessed, such as that of the remote location 104. Similarly, if the builder 122 is building a requested trust level for an application that is to be accessed from a local source (such as the local memory 120), the published location for the application can be a filing system address from which the application can be accessed locally. Published locations can be used by the runtime 122 to aid it in determining appropriate trust levels at which to execute applications.

By building requested trust levels for applications, the builder 122 enhances security for computer systems. It also provides for a consistent user experience. Applications having requested trust levels can be executed at a consistent trust level regardless of where the application is executed from. By so doing, a user's experience can be consistent without regard to what computer or device from which the user executes the application. Also, applications having requested trust levels are more likely to behave robustly. These applications, because they are executed at a consistent trust level, are not subject to fluctuations due to being executed at a trust level at which they were not designed.

Executing an Application at an Appropriate Trust Level

Figure 4:
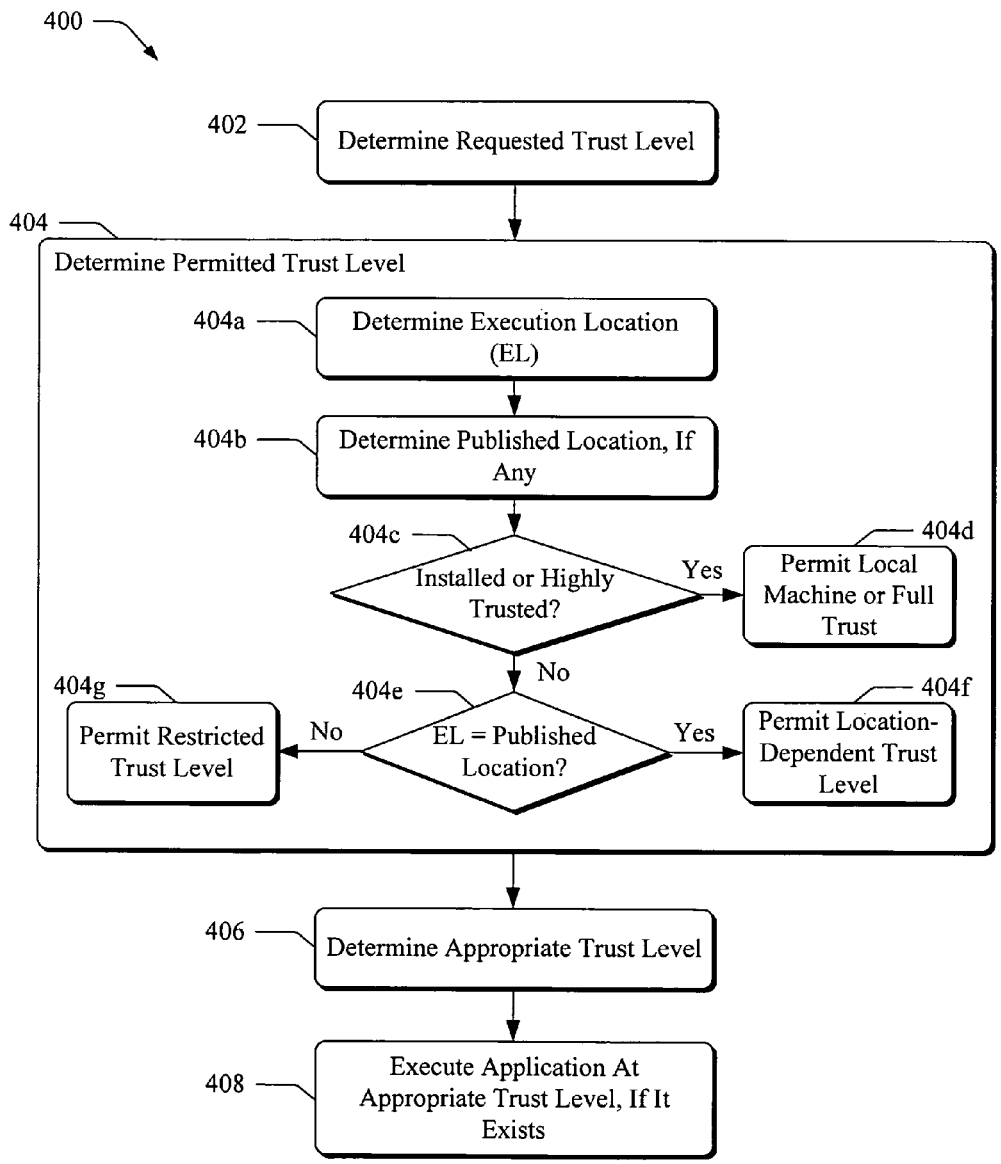
FIG. 4 sets forth a flow diagram of an exemplary process for executing an application at an appropriate trust level.

Referring to FIG. 4, an exemplary process 400 for executing an application at an appropriate trust level is shown. The process 400 is illustrated as a series of blocks representing individual operations or acts performed by the tools 116 and/or the runtime 124. This process 400 can be implemented following the process 200 or can be implemented separately as a stand-alone process.

In the ongoing embodiment the application 126 is used for purposes of discussion. The application 126 can be received, accessed, executed, or cached from a remote source or locally, such as the remote location 104 and the local memory 120, respectively. The application 126 has a requested trust level, though that requested trust level may or may not have been built by the builder 122 as described in the process 200 above.

In some embodiments the process 400 begins when a user attempts to execute the application 126, such as by double-clicking on the application 126. When the user does so, the tools 116 can cache the application 126 to the cache 118 (shown) from an accessible location of the application 126.

Determining a Requested Trust Level

At block 402, a requested trust level for an application is determined. In the ongoing embodiment, the runtime 124 extracts from the application 126 an embedded requested trust level. The runtime 124 can determine whether or not the attributes 308, 310, or 312 are embedded in the application 126. Thus, if the runtime 124 determines that the attribute 308 of "requireFullTrust=yes" is embedded in the application 126, it determines that the application 126 requests the full trust level 302. If the runtime 124 determines that the attribute 310 of "trustLevel=Domain" is embedded in the application 126, it determines that the application 126 requests the location-dependent trust level 304. Similarly, if it determines that the attribute 312 of "trustLevel=Restricted" is embedded, the application 126 requests the restricted trust level 306.

Because the application 126 can contain malicious code, the runtime 124 does not trust the requested trust level of the application 126. For example, criminal persons might write applications having various requested trust levels using a copy of the builder 122, for instance. The requested trust level of the application 126, however, can be used by the runtime 124 to help determine an appropriate trust level for executing the application 126, if one exists.

Determining a Permitted Trust Level

At block 404, a permitted trust level for an application is determined. This permitted trust level can be independent of how an application is transmitted. Whether an application is received via email, or a floppy disk, or through other manners, the permitted trust level can be the same. Likewise, from where an application originates, such as from a website or another computer user, does not determine what trust level is permitted. Rather, a permitted trust level for an application can be determined based on from what location it is cached or executable and its published location.

In the ongoing embodiment, the runtime 124 determines the permitted trust level for the application 126. It can do so based on from what location the application 126 is executable or cached, a published location extracted from the application 126, and/or having a signed certificate. The runtime 124 can use the published location to aid in determining a permitted trust level, but the runtime 124 does not need to trust the published location or any other information extracted from the application 126, as will be apparent below.

Figure 5:
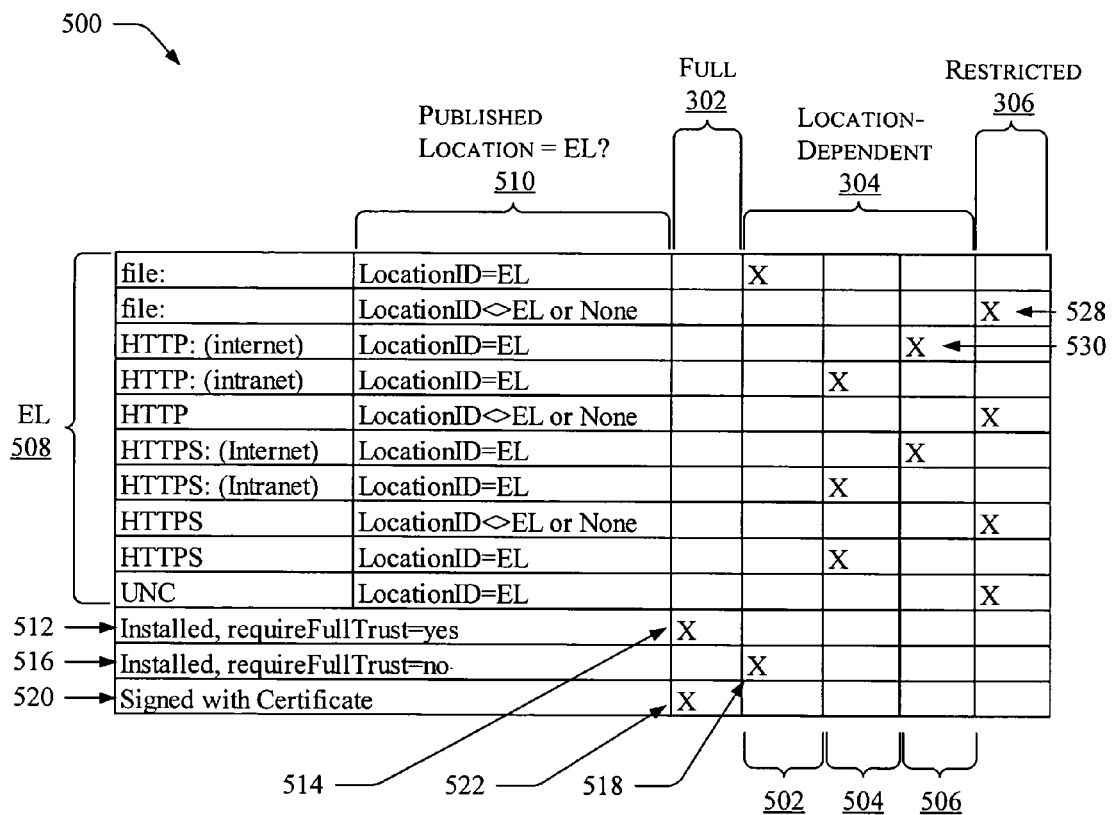
FIG. 5 illustrates an exemplary table showing permitted trust levels.

Referring to FIG. 5, an exemplary table 500 setting forth exemplary permitted trust levels is shown. The trust levels shown are set forth as examples; other permitted levels can be used or defined. The exemplary trust levels comprise the full trust level 302, the location-dependent trust level 304, and the restricted trust level 306. The location-dependent trust level 304 can be further delineated, in this embodiment into three sublevels: a local machine trust level 502; an intranet trust level 504; and an Internet trust level 506. The local machine trust level 502 is a higher trust level than the intranet trust level 504, which is higher than the Internet trust level 506. Various potential execution locations for the application 126 are set forth at numeral 508. Whether or not the execution locations ("ELs") 508 for the application 126 matches the published location (here shown with the attribute "LocationID=") is shown at a column 510 of FIG. 5.

At block 404a, the location from which an application is executable or cached is determined. In the ongoing embodiment, the runtime 124 determines the execution location 508 for the application 126.

At block 404b, a published location for an application is determined. In the ongoing embodiment, the runtime 124 determines a published location for the application 126 by extracting this information from the application 126, if the application 126 contains a published location. Here the published location can be indicated with an XML attribute, such as "LocationID=Domain", where "Domain" is a URL.

At block 404c, whether or not an application is installed or highly trusted is determined. In the ongoing embodiment, the runtime 124 determines whether or not the application 126 is installed or highly trusted. If it is, the runtime 124 follows the "Yes" path and permits local machine trust 502 or full trust 302, at block 404d. If not, it follows the "No" path to block 404e.

At block 404d, if the runtime 124 determines that the application 126 is installed and requests full trust, such as by extracting "requireFullTrust=yes", shown in table 500 at 512, the runtime 124 permits the application 126 to be executed at full trust 302, shown in table 500 at 514. If the runtime 124 determines that the application 126 is installed but does not request full trust, such as by extracting "requireFullTrust=no", shown in table 500 at 516, the runtime 124 permits (but not requires) the application 126 to be executed at local machine trust 502, shown at 518.

Also at block 404d, if the runtime 126 has determined that the application 126 is highly trusted, such as by being signed with a certificate (shown at numeral 520), the runtime 124 permits full trust 302, shown at 522.

At block 404e, an execution location ("EL") and published location are compared. If the execution location and the published location match, the runtime 124 proceeds along the "Yes" path to block 404f. If not, it proceeds along the "No" path to block 404g.

At block 404f, location-dependent trust level 304 is permitted. In the ongoing embodiment, the runtime 124 permits either the machine level trust 502, the intranet level trust 504, or the Internet level trust 506, based on either the published location or the execution location. As set forth in FIG. 5, these location-dependent trust levels 502, 504, and 506 are permitted.

Assume, for example, that a user receives an email with the application 126 attached. Also assume that the user saves the application 126 to his or her local memory 120. At some later point, if the user attempts to execute the application 126, the runtime 124 will follow the process 400 to determine an appropriate trust level at which to execute the application 126, if one exists. In this example, assume that the runtime 124 determines, at block 402, that the application 126 requests location-dependent trust level 304 for a website on the Internet (e.g., the Internet level trust 506). The runtime 124 does not need the requested trust level to determine a permitted trust level, as the requested trust level is not trusted.

At block 404a, the runtime 124 determines that the execution location for the attached application 126 is the local machine memory 120. At block 404b, assume that the runtime 124 extracts the published, remote location for the website from the attached application 126. At block 404e, the runtime 124 determines that the execution location and the published location are not the same. Because of this, the runtime 124 permits only restricted trust level 306 (shown at 528). This ensures that the application 126 is not given too high a trust. In this example, the attached application 126 can contain malicious code; the attached application 126 could be built to request a trust based on a website and have a published location matching that website without either these being trustworthy. Because the application 126 did not necessarily originate at the website that it claims to have originated from, it is not trusted. Thus, the runtime 124 will not permit location-dependent trust 304 or full trust 302 (assuming the application 126 isn't highly trusted for some other reason).

In some cases, though, the runtime 126 permits location-dependent trust level 304. If an application is cached from the same location as published for the application, for instance, the runtime 126 will consider the application more trustworthy. If, for example, a user attempts to execute from a website the application 126, the runtime 124 can determine that the execution location of the application 126 is the website. If the application 126 also has a published location of this website (extracted by the runtime 124), which matches the execution location, the runtime 124 permits the application 126 to be executed at the Internet trust level 506. This is permitted because a trust level associated with that website is logical to permit; as the application 126 has been determined to actually be from that website (it has an execution location matching a published location of that website). That website can have a particular trust level associated with it that is set by an administrator or based on various factors analyzed using an algorithm, or through other well-known manners.

Determining and Executing at an Appropriate Trust Level

At block 406, an appropriate trust level is determined. The appropriate trust level can be determined based on comparing a requested trust level for an application with a permitted trust level. If an application has a requested trust level less than that of a permitted trust level, the runtime 124 can set the appropriate trust level as that of the requested trust level. If an application has a permitted trust level and requested trust level that are equal, the runtime 124 can set the appropriate trust level as that of the permitted trust level. If an application has a requested trust level higher than that of its permitted trust level, the runtime 124 can fail to set any trust level as appropriate. By failing to permit execution of an application at a lower trust level that it requests, the runtime 124 can limit inconsistent or non-robust operation of the application.

At block 408, an application is executed at an appropriate trust level, if one exists.

In the ongoing embodiment, the runtime 124 determines appropriate trust levels, which can comprise: the full trust level 302; the location-dependent trust level 304; or the restricted trust level 306. If no appropriate trust level exists, the runtime 124 will not execute the application 126 at block 408.

Referring to FIG. 6, an exemplary table 600 setting forth exemplary appropriate trust levels 602 are shown. These appropriate trust levels 602 shown are set forth as examples; other appropriate levels can be used or defined. The exemplary appropriate trust levels 602 at which an application can be executed comprise the full trust level 302, the location-dependent trust level 304, and the restricted trust level 306. The location-dependent trust level 304 is shown with further delineation, here the local machine trust level 502, the intranet trust level 504, and the Internet trust level 506. The table 600 shows one way in which the runtime 124 can determine appropriate trust levels 602 based on permitted trust levels shown in column 604 and requested trust levels of full trust, location-dependent trust, and restricted trust, shown in columns 606, 608, and 610, respectively.

If the requested trust level of the application 126 is the restricted trust level 306, the runtime executes the application 126 at that level. If the permitted trust level is higher than the restricted trust level 306, the application 126 likely can be executed and operate fully at the restricted trust level 306. As shown in the table 600, if the permitted trust level shown in column 604 is the local machine trust level 502, for instance, the runtime executes the application 126 at the restricted trust level 306 if that is requested (shown at 612). Various ways in which the runtime 124 can execute applications at the restricted trust level 306 and embodiments of this level are set forth in greater detail below in a section entitled, "Exemplary Restricted Trust Level."

If the requested trust level is higher than the permitted trust level, the runtime 124 may not execute the application 126. Executing an application at a lower trust level that it requests can sacrifice robust and consistent operation of the application. This also can diminish a user's experience in using the application. Executing the application at above the permitted level can be dangerous, and so is not done. As shown in the table 600, if the permitted trust level shown in column 604 is restricted but the requested trust level shown at column 608 is location-dependent, the runtime 124 can fail to execute the application 126 (shown at numeral 614).

If the requested trust level is equal to the permitted trust level, the runtime 124 executes the application at the permitted/requested trust level. Examples of this are shown at numerals 616, 618, and 620.

Thus, the runtime 124 executes applications at appropriate trust levels. Applications may not be executed at higher trust levels than those at which they can be trusted. They can be executed at lower trust levels if they can be robustly and fully operated at these lower trust levels, based on a lower, requested trust level. And they can be executed at a permitted trust level if they can be trusted at this level and need to be executed at this level for full operation.

Exemplary Restricted Trust Level

Figure 7:
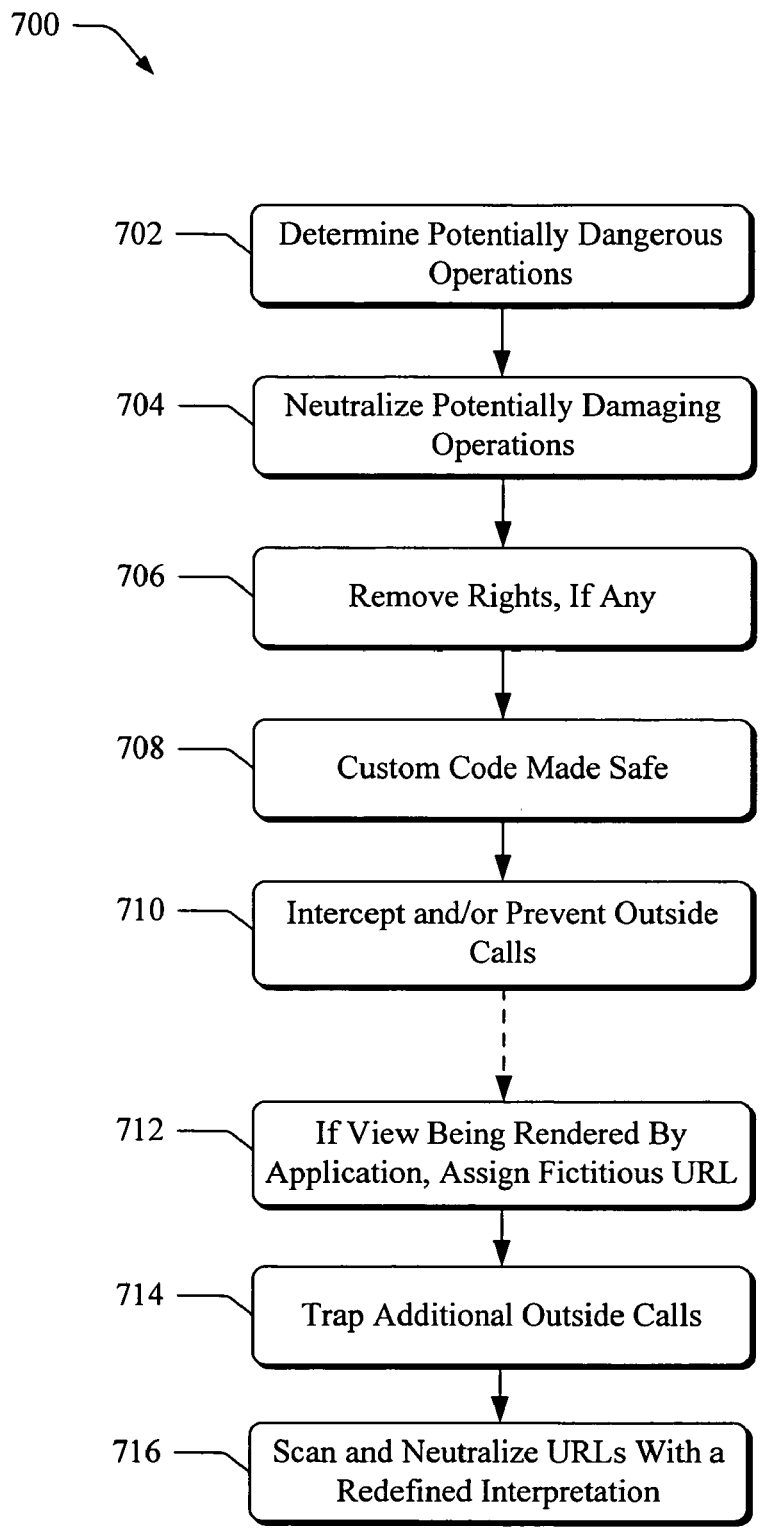
FIG. 7 sets forth a flow diagram of an exemplary process for executing or preparing for execution an application at a restricted trust level.

Referring to FIG. 7, an exemplary process 700 for executing an application at an exemplary restricted trust level is shown. This restricted trust level permits execution of applications while prohibiting those applications from performing operations capable of endanger a user's computer or information. The process 700 is illustrated as a series of blocks representing individual operations or acts performed by the tools 116 and/or the runtime 124. This process 700 can be implemented as part of the process 400 or can be implemented separately as a stand-alone process. The restricted trust level set forth in this process is one implementation of the restricted trust level 306 described above.

At block 702, potentially damaging operations in an application are determined. In an ongoing embodiment, the runtime 124 scans the application 126 for custom code and/or any feature that requires connections to any data source outside of the application's 126 boundaries. The runtime 124 can do so by finding all URLs (e.g., links and website domains) in the application 126. These URLs can indicate that the application 126 is capable of accessing information or locations outside of the application 126 itself.

At block 704, potentially damaging operations are neutralized. In the ongoing embodiment, the runtime 124 neutralizes URLs found in the application 126, so that no data source outside the application boundaries can be contacted.

At block 706, rights potentially exercised for an application are removed. In the ongoing embodiment, the runtime 124 assigns a random execution location and/or published location to the application 126. By so doing, a trust level above restricted that potentially could be allowed for the application 126 due to its execution location or published location is removed.

At block 708, all custom code of an application is made safe. In the ongoing embodiment, the runtime 124 forbids and/or makes inaccessible all data connections (except email submittal), ActiveX controls, custom code written using managed code, roles, workflow, and the like in the application 126. Script is allowed only if it interacts exclusively with the data within the application.

At block 710, outside calls attempted during execution are intercepted and/or prevented. In the ongoing embodiment, the runtime 124 executes the application 126 but intercept and prevents any outside calls by the application 126 (such as to a URL).

If, for example, the application 126 is a form template but is to be executed at this restricted trust level, the application 126 can create information but cannot access any information other than the information that it creates. In the case of a form template, the runtime 124 executes the template and permits it to create an electronic document, receive data keyed into the electronic document from a user, and the like. The runtime 124 does not permit, however, the template from accessing or sending information outside of the application's boundaries, such as from or to a user's memory (e.g., the memory 114), an intranet site, or an Internet site.

At block 712, if the application 126 is rendering a view the runtime 124 assigns a fictitious URL to the view. This fictitious URL can have a very low level of permission. The runtime 124, following this low level, can prevent calls to external resources that the application 126's view is attempting to reach. In one embodiment, the view comprises Hyper Text Machine Language (HTML). HTML is a language that is capable of referencing URLs in many different ways, such as to script, styles, pictures, and frames. In part for this reason, the runtime 124 can perform additional operations to further secure the view, set forth at blocks 714 and 716.

At block 714, the runtime 124 traps outside calls, such as those attempted by the view that are not prohibited at block 712. In one embodiment, the runtime 124 traps outside calls by mapping all URLs through one or more particular code paths. Thus, these calls must use these code paths. The runtime 124 can, however, block these code paths, thereby prohibiting these outside calls from being made using these URLs.

In some cases, however, the application's 126 view is capable of making an outside call through a URL with a redefined interpretation.

At block 716, the runtime 124 finds and neutralizes URLs with a redefined interpretation. When URLs are interpreted in new ways, it can be difficult to prevent outside calls that use them. To aid in preventing these outside calls, the runtime 124 can scan a rendered view as it is updated to find these URLs. As the view is updated, the runtime 124 determines whether or not URLs are being interpreted in a new way. If so, the runtime 124 neutralizes these URLs, such as by deleting them from the view.

In one embodiment, the view comprises HTML. In these cases, a URL can be interpreted in a new way with a "base tag". The runtime 124 can delete base tags that redefine how a URL is interpreted from the HTML code of the view.

CONCLUSION

The above-described tool enables execution of applications at appropriate trust levels. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer-implemented method, performed by a processor executing computer executable instructions stored in a memory device, the method comprising:

determining operations performable by an application, stored in the memory device, that will endanger a computer or its information by finding one or more universal resource locators (URLs) in the application and analyzing code associated with each URL to determine whether the code is configured to communicate with one or more remote locations;

building a requested trust level for the application, the requested trust level indicating a minimum trust level at which the application is permitted to perform said determined operations that will endanger a computer or its information, and the requested trust level comprising at least one of:

a full trust level that requests permission to perform any operation;

a location-dependent trust level that requests permission to perform at least one operation that can compromise security; or a restricted trust level that does not request permission to perform a security compromising operation; and embedding the location-dependent trust level into the application.

2. The computer-implemented method of claim 1, wherein the act of embedding comprises attaching the requested trust level to the application.

3. The computer-implemented method of claim 1, further comprising adding an eXtensible Markup Language (XML) attribute to the application that is associated with the requested trust level.

4. A computer-implemented method, performed by a processor executing computer executable instructions stored in a memory device, the method comprising:

determining a requested trust level for an application, stored in the memory device, by extracting from the application an embedded requested trust level, the requested trust level corresponding to a minimum trust level at which the application is permitted to perform an operation that can compromise security, wherein the requested trust level comprises at least one of:

a full trust level that requests permission to perform any operation;

a location-dependent trust level that requests permission to perform at least one operation that can compromise security; or a restricted trust level that does not request permission to perform a security compromising operation;

determining a permitted trust level for the application by comparing a universal resource locator (URL) that indicates an execution location of the application with an additional URL that indicates a published location of the application, and if the execution location is not the same as the published location determining the permitted trust level to be a restricted trust level, and if the execution location is the same as the published location determining the permitted trust level to be a location-dependent trust level, and if the application is highly trusted determining the permitted trust level to be a full trust level;

and
comparing the requested trust level for the application and the permitted trust level and performing at least one of:
executing the application at the requested trust level if the requested trust level is less than the permitted trust level;
executing the application at the permitted trust level if the permitted trust level and the requested trust level are equal; or
failing to execute the application if the requested trust level is greater than the permitted trust level.

5. The computer-implemented method of claim 4, further comprising determining the execution location of the application.

6. The computer-implemented method of claim 4, wherein the execution location comprises a location from which the application is cached.

7. The computer-implemented method of claim 4, further comprising determining the published location for the application.

8. The computer-implemented method of claim 4, wherein the requested trust level is the location-dependent trust level.

9. The computer-implemented method of claim 8, wherein the location-dependent trust level comprises a local machine, intranet, or Internet trust level.

10. The computer-implemented method of claim 4, wherein the requested trust level comprises the restricted trust level.

11. The computer-implemented method of claim 10, wherein the restricted trust level does not permit operations configured to access information outside that created by the application.

12. The computer-implemented method of claim 10, wherein the restricted trust level enables safe execution of the application.

13. A computer-implemented method, performed by a processor executing computer executable instructions stored in a memory device, the method comprising:
determining an appropriate trust level at which to execute an application stored in local memory of the memory device, the determining comparing a requested trust level for the application with a permitted trust level for the application, the requested trust level indicating a minimum trust level at which the application is permitted to perform an operation that can compromise security, and the requested trust level extracted from the application and comprising at least one of:
a full trust level that requests permission to perform any operation,
a location-dependent trust level that requests permission to perform at least one operation that can compromise security; or
restricted trust level that does not request permission to perform a security compromising operation;
the permitted trust level determined by comparing the local memory with a URL that indicates a published location of the application, and, if the local memory is not the same as the published location determining the permitted trust level to be a restricted trust level, and if the local memory is the same as the published location determining the permitted trust level to be a location-dependent trust level, and if the application is highly trusted determining the permitted trust level to be a full trust level; and
executing the application at the appropriate trust level, the appropriate trust level being the requested trust level if the requested trust level is less than a permitted trust level or the permitted trust level if the permitted trust level and the requested trust level are equal.

* * * * *